US012013947B2

(12) United States Patent
Robinson et al.

(10) Patent No.: US 12,013,947 B2
(45) Date of Patent: Jun. 18, 2024

(54) SECURE BOOT OF VEHICULAR PROCESSORS

(71) Applicant: Motional AD LLC, Boston, MA (US)

(72) Inventors: Karl Robinson, Norwell, MA (US); Zachary David Gauci, South Boston, MA (US)

(73) Assignee: Motional AD LLC, Boston, MA (US)

(*) Notice: Subject to any disclaimer, the term of this patent is extended or adjusted under 35 U.S.C. 154(b) by 0 days.

(21) Appl. No.: 17/571,629

(22) Filed: Jan. 10, 2022

(65) Prior Publication Data

US 2022/0237299 A1 Jul. 28, 2022

Related U.S. Application Data

(63) Continuation of application No. 16/837,681, filed on Apr. 1, 2020, now Pat. No. 11,222,121.

(60) Provisional application No. 62/828,019, filed on Apr. 2, 2019.

(51) Int. Cl.
G06F 9/44 (2018.01)
G06F 9/4401 (2018.01)
G06F 21/57 (2013.01)

(52) U.S. Cl.
CPC .......... *G06F 21/575* (2013.01); *G06F 9/4416* (2013.01); *G06F 2221/034* (2013.01)

(58) Field of Classification Search
CPC . G06F 21/575; G06F 9/4416; G06F 2221/034
See application file for complete search history.

(56) References Cited

U.S. PATENT DOCUMENTS 9,152,432 B2 10/2015 Cabot et al.
9,851,981 B2 12/2017 Schwind
10,878,076 B2 * 12/2020 Yamagishi ....... H04N 21/44224
(Continued)

FOREIGN PATENT DOCUMENTS

CN 1412669 4/2003
CN 108243141 7/2018
(Continued)

OTHER PUBLICATIONS

[No. Author Listed], "J3016: Taxonomy and Definitions for Terms Related to On-Road Motor Vehicle Automated Driving Systems" SAE International, Sep. 2016, 30 pages.

*Primary Examiner* — Zahid Choudhury
(74) *Attorney, Agent, or Firm* — Fish & Richardson P.C.

(57) ABSTRACT

Among other things, techniques for securely booting processors in a vehicle are described. An apparatus comprises a circuit coupled to one or more processors of a vehicle and managing a secure boot process for the processors. The circuit receives an indication that the vehicle has been powered on and sends, to a network server, a request for boot files for the processors of the vehicle. In response, the circuit receives, from the server, most recent versions of boot files respectively corresponding to the processors, wherein each boot file includes a digital signature of a trusted authority. In response to obtaining the most recent versions of the boot files, the circuit sequentially boots the processors using the respective boot files, wherein each processor executes a corresponding boot file upon verifying authenticity of the digital signature in the boot file using a corresponding class authentication key.

22 Claims, 18 Drawing Sheets

(56) References Cited

U.S. PATENT DOCUMENTS

| | | |
|---|---|---|
| 11,222,121 B2 | 1/2022 | Robinson et al. |
| 11,580,152 B1* | 2/2023 | Ramachandran ....... G06F 16/41 |
| 2006/0143432 A1 | 6/2006 | Rothman et al. |
| 2007/0067410 A1 | 3/2007 | Mulligan |
| 2012/0143402 A1* | 6/2012 | Kim ................... H04L 65/60 |
| | | 709/219 |
| 2013/0185563 A1 | 7/2013 | Djabarov et al. |
| 2014/0109076 A1 | 4/2014 | Boone et al. |
| 2014/0149647 A1 | 5/2014 | Guo et al. |
| 2014/0379871 A1* | 12/2014 | Van Brandenburg ....................... |
| | | H04L 65/613 |
| | | 709/219 |
| 2015/0301821 A1 | 10/2015 | Danne et al. |
| 2015/0331686 A1 | 11/2015 | Petersen et al. |
| 2017/0242801 A1 | 8/2017 | Sangameswaran et al. |
| 2018/0239929 A1 | 8/2018 | Shell et al. |
| 2018/0356821 A1 | 12/2018 | Kentley-Klay et al. |
| 2018/0367637 A1* | 12/2018 | Balazinski ....... H04N 21/64322 |
| 2018/0375915 A1* | 12/2018 | Sridhar ................... H04L 47/10 |
| 2019/0087581 A1 | 3/2019 | Kim et al. |
| 2020/0034237 A1 | 1/2020 | Suryanarayand et al. |
| 2020/0314096 A1 | 10/2020 | Mondello et al. |
| 2020/0320201 A1 | 10/2020 | Robinson et al. |
| 2021/0288942 A1* | 9/2021 | Preda ....................... H04L 65/70 |

FOREIGN PATENT DOCUMENTS

| | | |
|---|---|---|
| DE | 102015208750 | 11/2015 |
| KR | 10-2013-0138196 | 12/2013 |
| KR | 2017-0049738 | 5/2017 |

\* cited by examiner

SECURE BOOT OF VEHICULAR PROCESSORS

CROSS-REFERENCE TO RELATED APPLICATION

This application is a continuation of U.S. application Ser. No. 16/837,681, filed Apr. 1, 2020, now allowed, which claims priority to U.S. Provisional Patent Application No. 62/828,019, filed Apr. 2, 2019, the entire contents of which are incorporated herein by reference.

FIELD OF THE INVENTION

This description relates to secure boot of vehicular processors.

BACKGROUND

Vehicles, e.g., autonomous or semi-autonomous cars or trucks, include processors to facilitate operations of the vehicles, e.g., processing information about the surrounding environment from on-board sensors, or controlling the steering or braking, or both, among others. When a vehicle powers on, the processors on board the vehicle are booted up using boot files.

SUMMARY

In one aspect, an apparatus comprises a circuit coupled to one or more processors of a vehicle and managing a secure boot process for the one or more processors. When the vehicle is powered on, the circuit sends, to a network server, a request for boot files for the one or more processors of the vehicle. In response to sending the request, the circuit receives, from the server, most recent versions of boot files respectively corresponding to the one or more processors, wherein each boot file includes a digital signature of a trusted authority. The circuit sequentially boots the one or more processors, sending respective boot files to the processors. Each processor of the one or more processors verifies authenticity of each respective boot file by validating a digital signature in the boot file using a corresponding class authentication key. The processor also confirms that the boot file is not black listed. When a boot file is verified as authentic and is not black listed, the processor executes the boot file.

In another aspect, an apparatus comprises a circuit coupled to one or more processors of a vehicle and managing a secure boot process for the one or more processors. The circuit sends, to a remote network server, a unique identifier of the vehicle. In response to sending the unique identifier to the network server, the circuit receives, from the network server, a first manifest file that includes information about one or more first boot files for execution by one or more processors associated with the apparatus. The circuit determines a version number specified for the first manifest file. Conditioned on determining that the version number specified for the first manifest file is a valid version, the circuit obtains the information on the first boot files from the first manifest file. The circuit determines, from the obtained information, a most recent version of each of the one or more first boot files indicated by the first manifest file is locally available to the apparatus. In accordance with a determination that the most recent versions of the first boot files are different from versions locally available to the apparatus, the circuit obtains, from a network resource, the most recent versions of the first boot files. In response to obtaining the most recent versions of the first boot files, the circuit boots the one or more processors, including providing, to each of the one or more processors, the first manifest file and a most recent version of the first boot file corresponding to the processor, wherein the processor executes the first boot file upon verifying authenticity of the first boot file.

In another aspect, an apparatus comprises one or more processors and a memory storing instructions that, when executed by the one or more processors, cause the one or more processors to generate, for a first platform, a first manifest file that provides information about a configuration of the first platform, the information including specifications of boot files for execution by one or more processors corresponding to the first platform. The instructions cause the one or more processors to send, to one or more first devices that use the first platform, a notification indicating that the first manifest file is available for the first platform. The instructions cause the one or more processors to receive, from a particular device of the one or more first devices, a request for the first manifest file, the request including a unique identifier of the particular device. The instructions cause the one or more processors to determine, using the unique identifier, that the particular device is using the first platform. Upon determining that the particular device is using the first platform, the instructions cause the one or more processors to send, to the particular device, the first manifest file.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
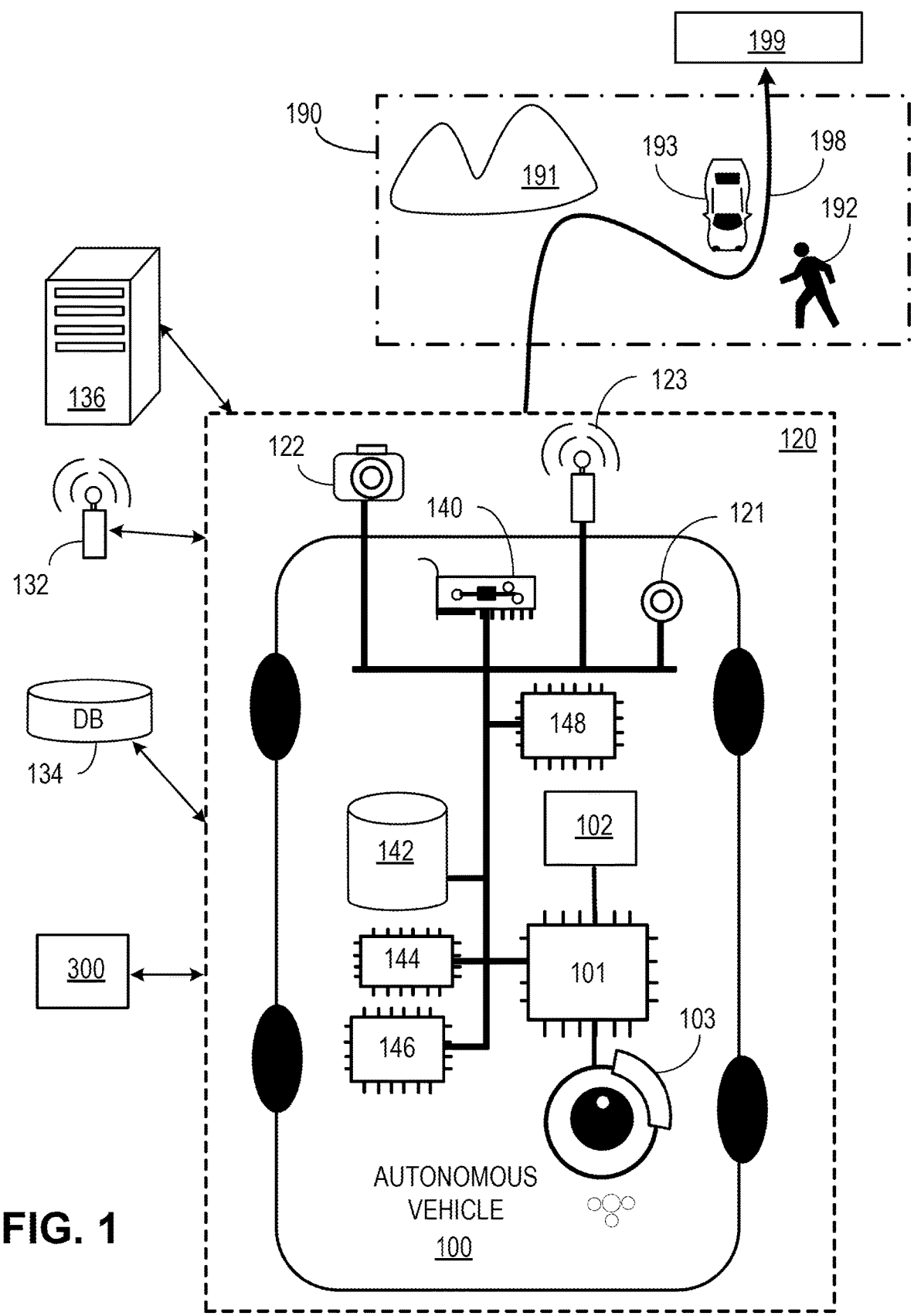
FIG. 1 shows an example of a vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Secure Booting of Vehicular Processors
8. Example Processes for Securely Booting Vehicular Processors General Overview In an embodiment, a controller circuit in a vehicle, such as an autonomous vehicle (AV), is coupled to various processors in the vehicle that perform functions to control operation of the vehicle. The controller boots the processors in a secure manner. When the vehicle is powered on, the controller fetches up-to-date boot file information from a remote network server or from storage, and sequentially boots the processors, sending to each processor boot files that are specific to the processor. The processors are grouped into one or more classes, depending on a type of each processor. A boot file common to a class of processors includes a digital signature signed with a class authentication key for the respective class, where the class authentication key is a cryptographic key that is used for authentication operations and commonly shared by all processors in a class, with different classes of processors having different class authentication keys. Each processor verifies the authenticity of the respective boot files by validating the digital signatures of the boot files using the common class authentication key for the class, and executes the boot files if the digital signatures are successfully verified.

In an embodiment, the boot file information fetched from the remote network server includes a manifest file, which describes boot files for the one or more processors and provides information on how the boot files should be used, and also specifies a configuration for the operating platform of the vehicle. In an embodiment, the boot files for a processor are software programs that are used to configure the hardware and software functionality of the processor, such that the processor is enabled to perform its intended functions in the vehicle, e.g., control driving decisions such as steering or braking, control one or more sensors in the vehicle, among others. In an embodiment, boot files are specified in the manifest file in docker containers, with the manifest file including separate docker containers for different processors. A docker container is a software package that includes one or more boot files for the corresponding processor. In an embodiment, a processor executes its boot files by executing the corresponding docker container. In another embodiment, a processor extracts its boot files from the corresponding docker container and executes the boot files individually.

The controller reads the manifest file and compares the manifest file to the version of an installed manifest file to identify changes to images of boot files that are locally cached. If there is no change to the boot files, the controller boots the processors using the locally cached versions. However, if there are changes to the boot files, then the controller retrieves the most recent versions from the remote network server and provides the most recent versions of the boot files to the processors when booting.

In an embodiment, the remote network server is a central server that controls the software running on a fleet of vehicles using manifest files. For each operating platform used by one or more vehicles in the fleet, the server generates a manifest file that specifies the hardware or software configuration, or both, of the vehicles running the platform. An operating platform refers to an operating system (OS) used by a vehicle to run its AV system, or a specific hardware configuration for the AV system of the vehicle, or both. The server notifies the vehicles about availability of manifest files for respective platforms. Upon receiving a request from a vehicle for a manifest file, the server determines, based on a unique identifier of the vehicle included in the request, a particular platform that the vehicle is running. Following this determination, the server sends, to the vehicle, the manifest file corresponding to platform that the vehicle is running.

The subject matter described herein can provide several technical benefits. For instance, embodiments can improve the operational security of a vehicle by enabling a discrete embedded controller to boot the processors on board the vehicle in a secure manner. Processors in a vehicle are booted only using manifest files sent from a central server, which helps to control the software the runs on the vehicle. A processor verifies that every boot file it receives from the controller is specified in the manifest file. A processor does not execute boot files that are not included in a valid manifest file, which avoids execution of unauthorized software in the vehicle. The system allows complete control from the central server over a fleet of vehicles that use manifest files from the server. Updates to existing configuration of a vehicle can also be performed in an efficient manner, by specifying any changes to the configuration by pushing a newer version of a manifest file that includes updated boot files.

In an embodiment, the controller verifies the version number of each manifest file by comparing to a local counter value, accepting only newer versions of the manifest file. This prevents rollback to an earlier, outdated version of the manifest file. The controller also checks the boot files specified in the manifest file to ensure that they can be run in synchronization with one another, such that the software running on the vehicle is a consistent set. Each processor also performs its own security check. By authenticating each boot file using a digital signature, each processor verifies that a respective boot file was generated by an authorized entity, e.g., the central server that controls the fleet of vehicles. Since a processor verifies a boot file using a class authentication key specific to the type of the processor, a boot file that is not configured for the type of the processor would not verify successfully, as the boot file would have a signature that uses a different class authentication key. This ensures that only a boot file configured for the class to which the processor belongs would be executed by the processor.

Different groups of vehicles in the fleet can be booted using different manifest files, thereby allowing different vehicles to be configured differently for different operational scenarios. A series of manifest files can be linked together for modular or layered updates to the configuration of a vehicle, with a base manifest file triggering fetching and execution of additional manifest files. A new vehicle can be configured at the factory with just a manifest client. When the vehicle reaches its destination and is ready for use, the manifest client can be used to download manifest files from the server, and the vehicle can then be configured for its intended use.

Hardware Overview

FIG. 1 shows an example of a vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the vehicle 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from one or more computer processors, which are collectively indicated by computer processor 146. In an embodiment, computer processor 146 is similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the vehicle 100, such as the AV's position, linear and angular velocity and acceleration, and heading (e.g., an orientation of the leading end of vehicle 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, the sensors 121 include monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processor 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the vehicle 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the vehicle 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of vehicle 100 to the remotely located database 134. In an embodiment, communication interfaces 140 transmit information that relates to teleoperations to the vehicle 100. In some embodiments, the vehicle 100 communicates with other remote (e.g., "cloud") servers 136.

In an embodiment, the remotely located database 134 also stores and transmits digital data (e.g., storing data such as road and street locations). Such data is stored on the memory 144 on the vehicle 100, or transmitted to the vehicle 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the vehicle 100, or transmitted to the vehicle 100 via a communications channel from the remotely located database 134.

Computing devices 146 located on the vehicle 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the vehicle 100. In an embodiment, peripherals 132 are similar to the display 312, input device 314, and cursor controller 316 discussed below in reference to FIG. 3. The coupling is wireless or wired. Any two or more of the interface devices may be integrated into a single device.

In an embodiment, the AV system 120 includes a plurality of computer processors 146 that control one or more of a plurality of devices, such as devices 101, a plurality of sensors, such as sensors 121, or a plurality of computer peripherals 132, such as computer peripherals 132. In an embodiment, when the vehicle 100 powers on, the plurality of computer processors 146 are booted using respective boot files. In an embodiment, the processors 146 in a vehicle are also referred to as compute nodes of the vehicle. In an embodiment, the boot files for the processors are also referred to as artifacts.

In an embodiment, the AV system 120 includes controller 148 to manage the process of booting the plurality of computer processors 146. In an embodiment, controller 148 is a discrete embedded controller, e.g., a microcontroller or microprocessor. In an embodiment, controller 148 communicates with a remote network server, e.g., server 136 or a server in a cloud data center, such as cloud data centers 204a, 204b, and 204c described with respect to FIG. 2, to determine the most recent versions of the boot files for the plurality of computer processors 146. In an embodiment, the controller 148 communicates with the remote server using the communications devices 140. Depending on the location of the most recent versions of the boot files, the controller 148 either obtains the most recent versions of the boot files from local storage, e.g., storage 142, or fetches the most recent versions of the boot files from a remote network location, such as from the server 136 or a remote storage specified by information from the server 136, such as remotely located database 134a, or from a cloud data center, such as cloud data centers 204a, 204b, and 204c. The process of booting the plurality of computer processors 146 using the controller 148 is described below in detail with respect to FIGS. 13-18.

Figure 2:
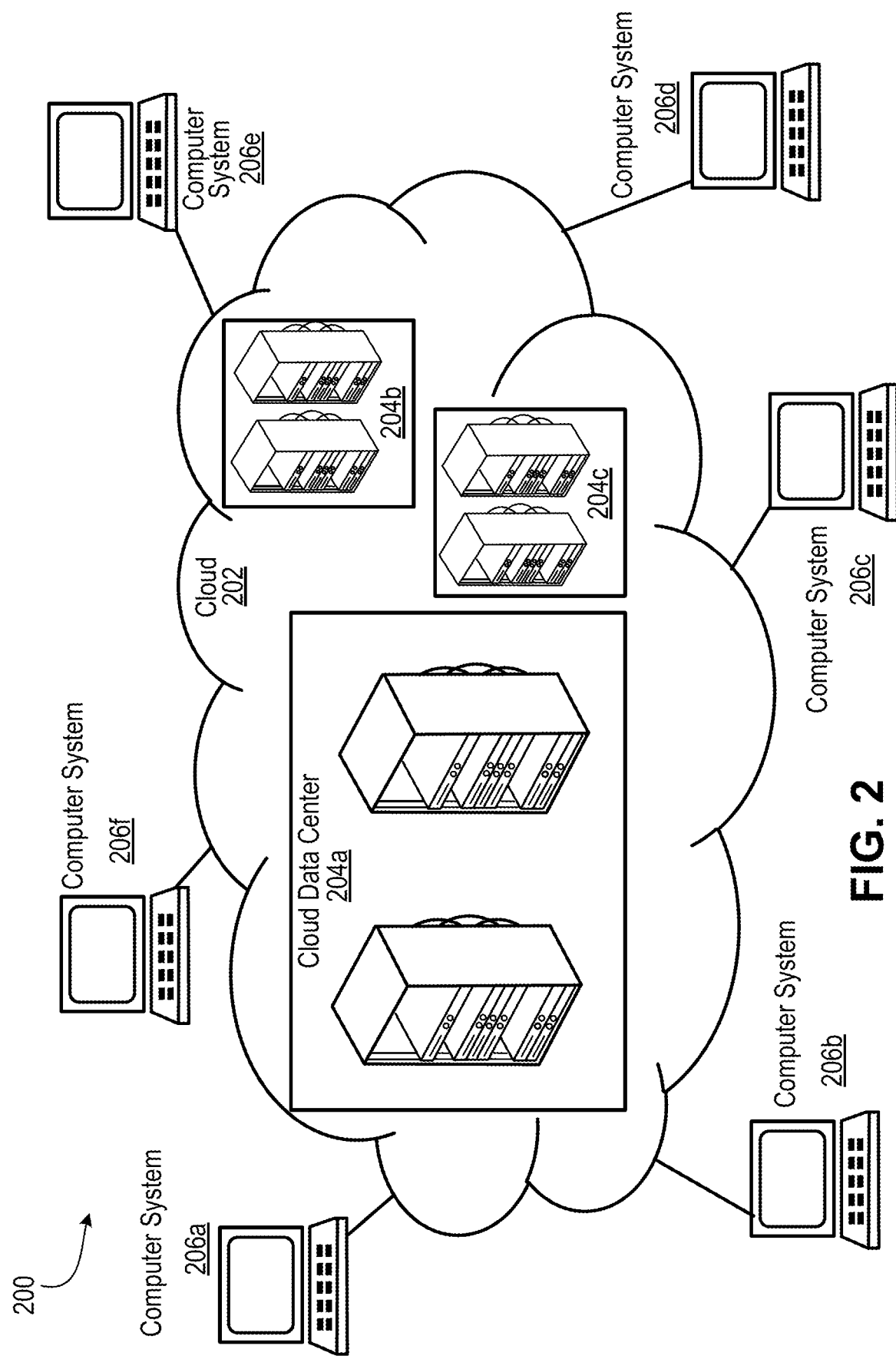
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
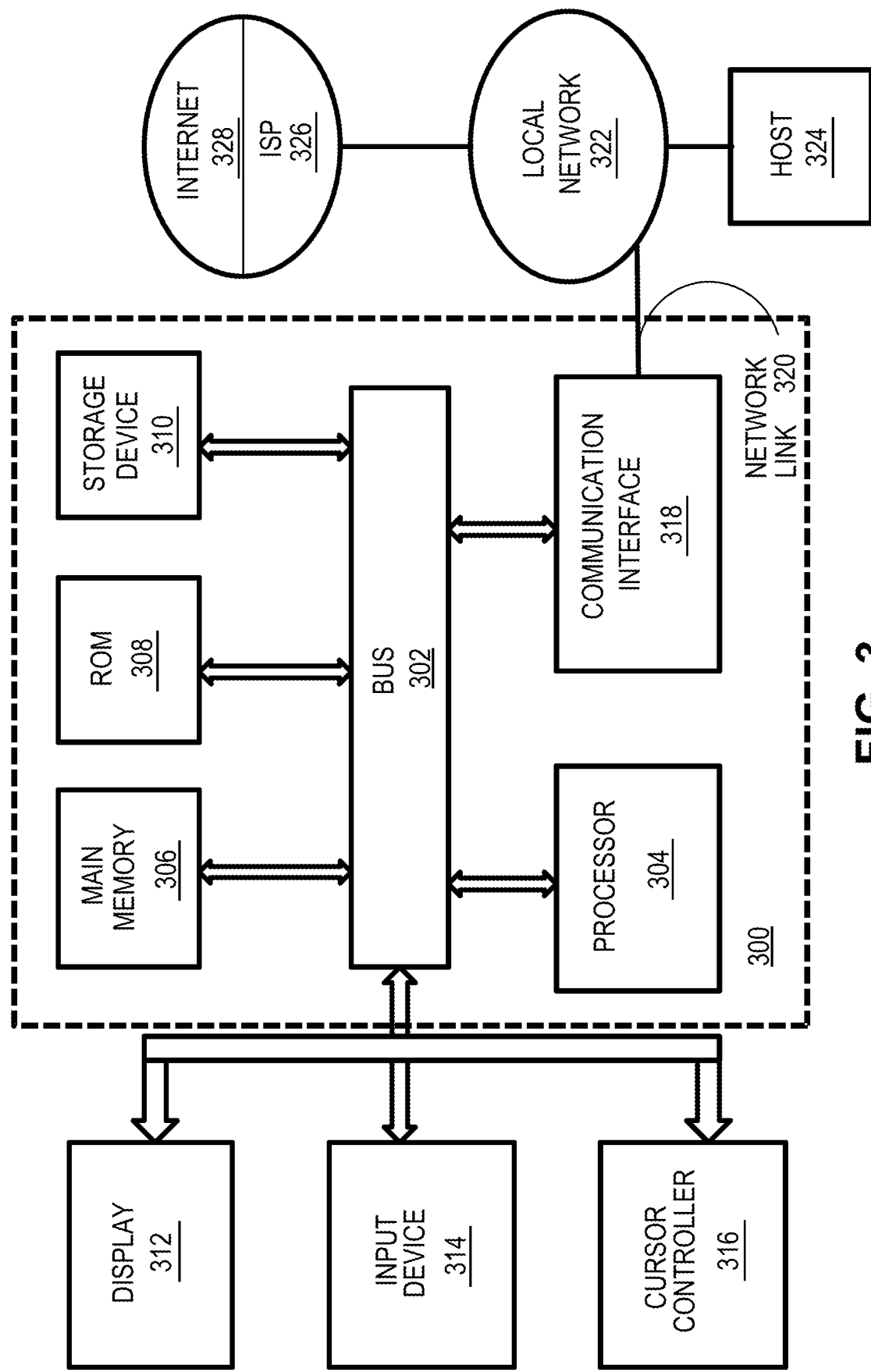
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
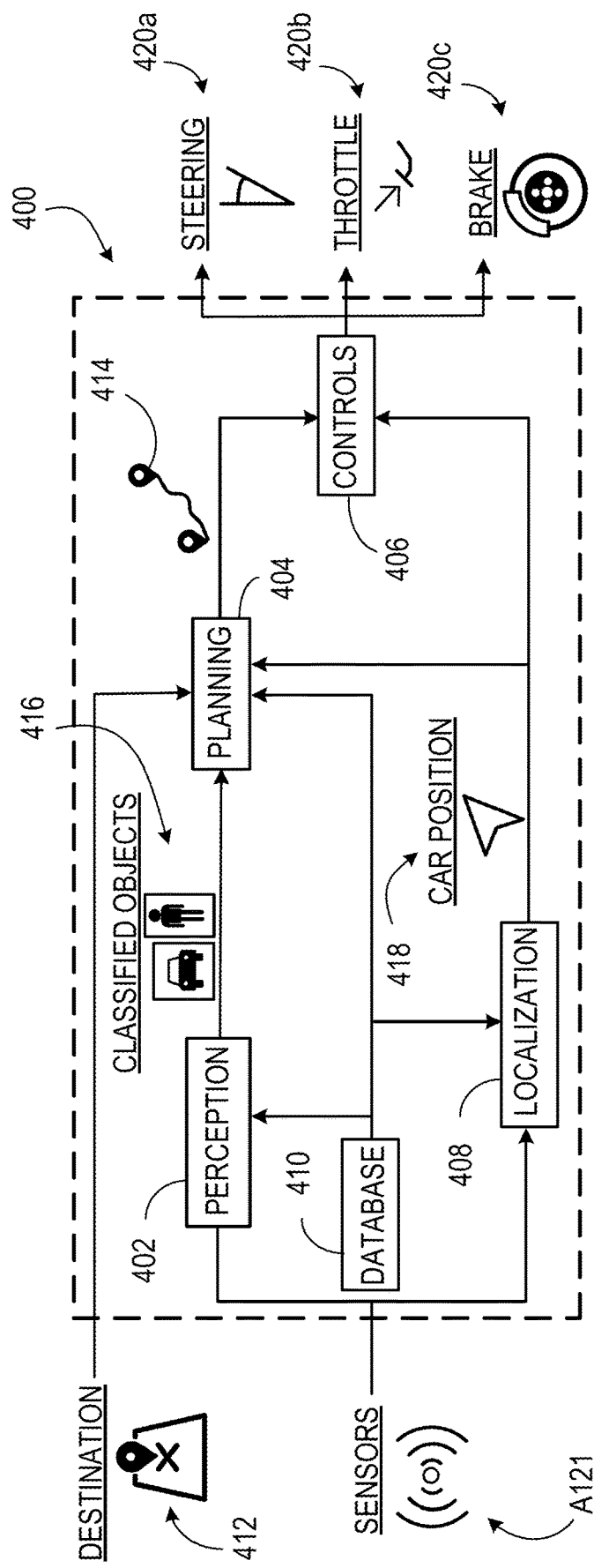
FIG. 4 shows an example architecture for an autonomous vehicle.

FIG. 4 shows an example architecture 400 for an autonomous vehicle (e.g., the vehicle 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the vehicle 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the vehicle 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the vehicle 100 to travel the trajectory 414 to the destination 412. For example, if the trajectory 414 includes a left turn, the control module 406 will operate the control functions 420a-c in a manner such that the steering angle of the steering function will cause the vehicle 100 to turn left and the throttling and braking will cause the vehicle 100 to pause and wait for passing pedestrians or vehicles before the turn is made.

Autonomous Vehicle Inputs

Figure 5:
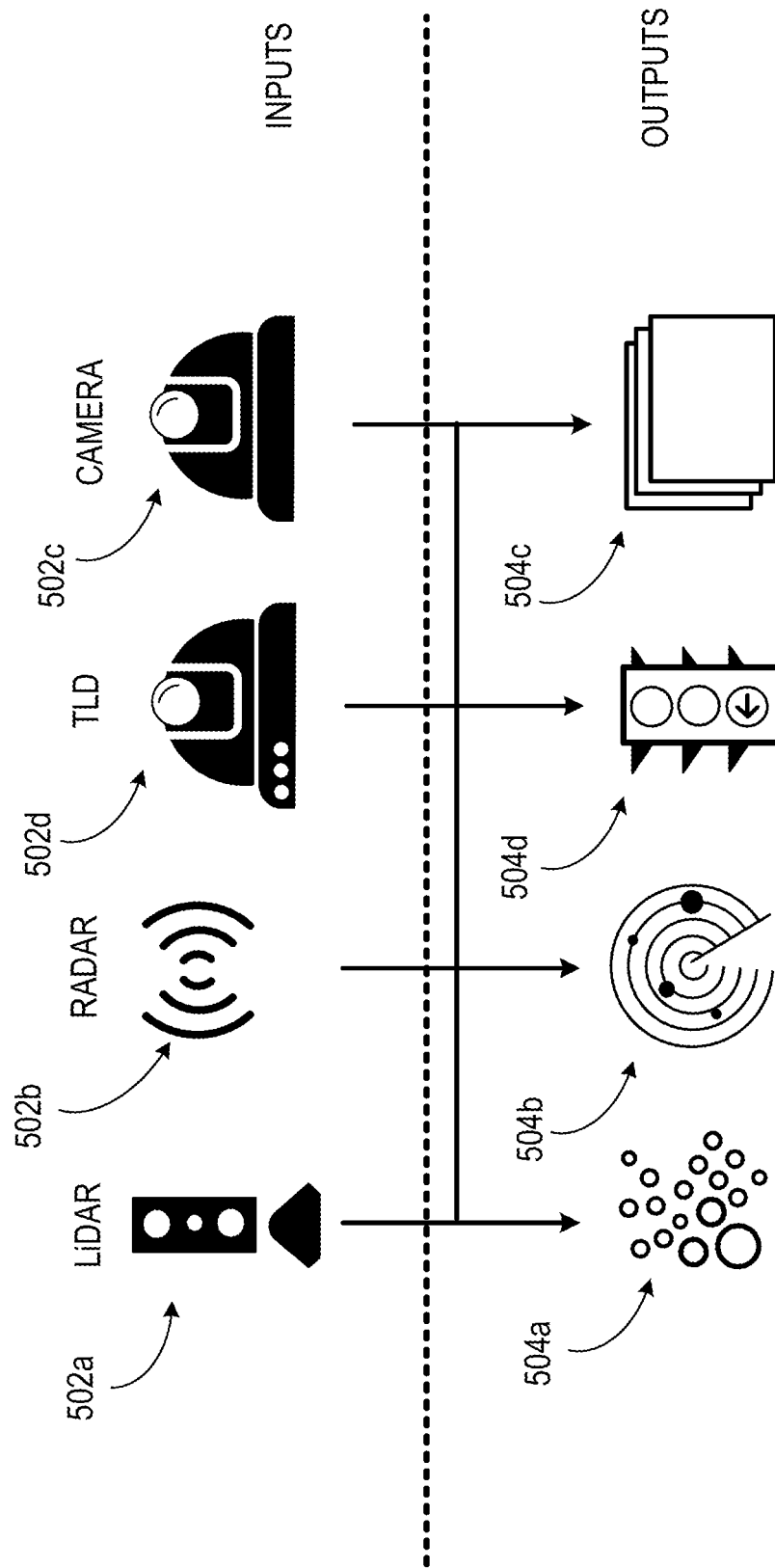
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the vehicle 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the vehicle 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
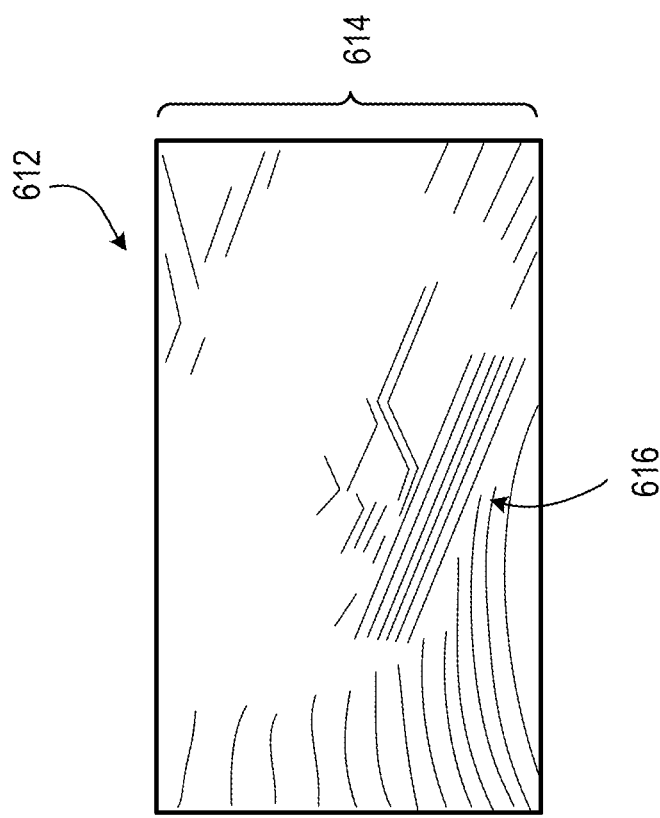
FIG. 6 shows an example of a LiDAR system.
Figure 6:
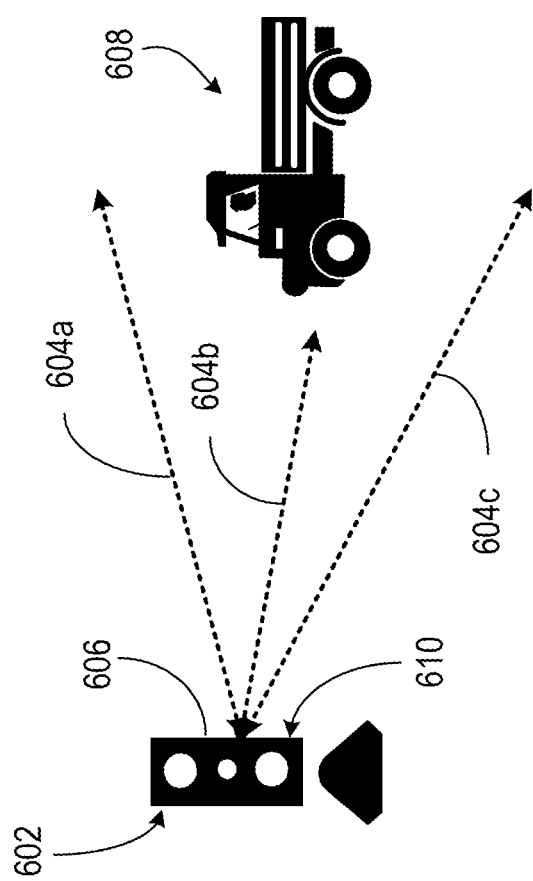

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
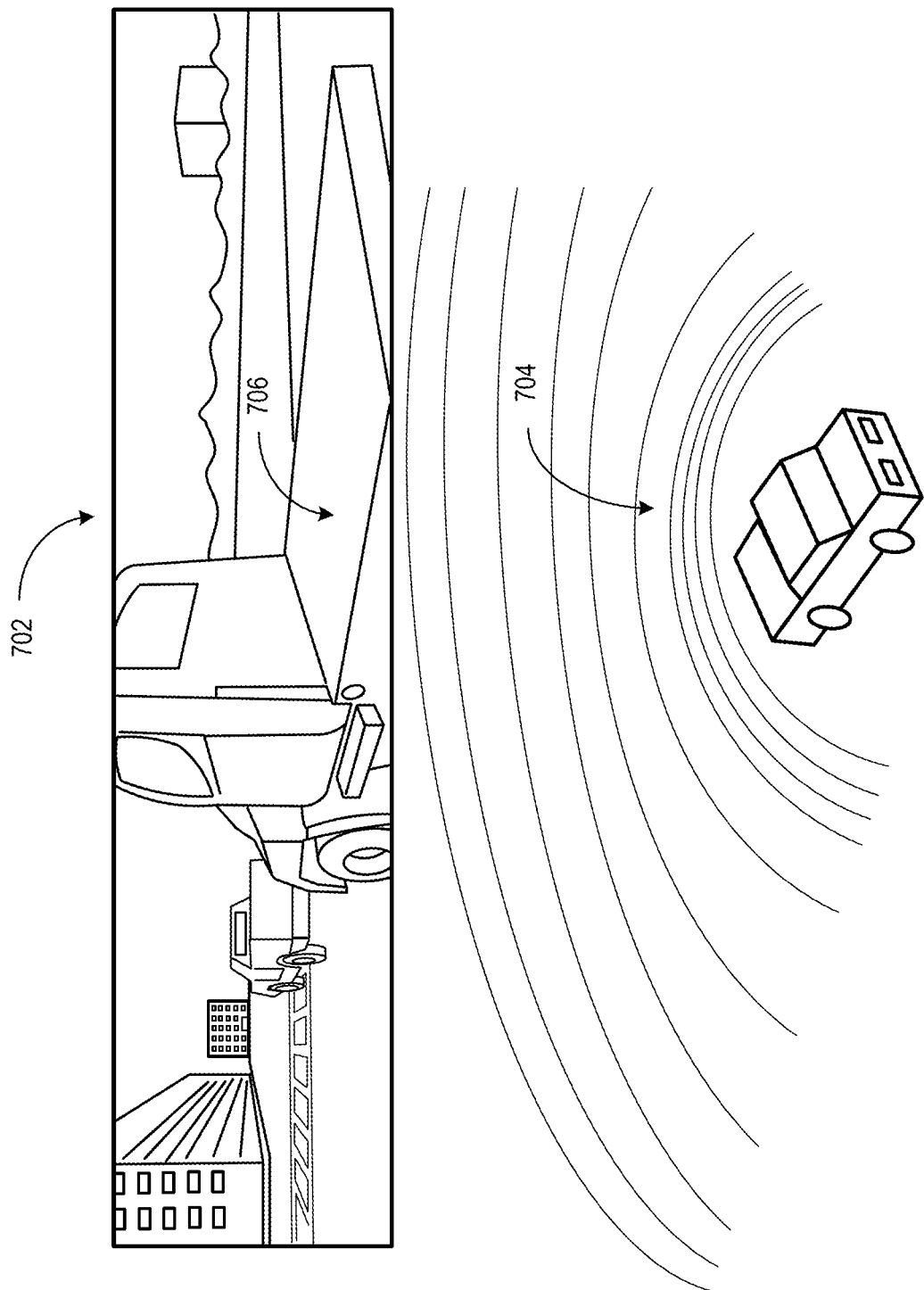
FIG. 7 shows the LiDAR system in operation.

FIG. 7 shows the LiDAR system 602 in operation. In the scenario shown in this figure, the vehicle 100 receives both camera system output 504c in the form of an image 702 and LiDAR system output 504a in the form of LiDAR data points 704. In use, the data processing systems of the vehicle 100 compares the image 702 to the data points 704. In particular, a physical object 706 identified in the image 702 is also identified among the data points 704. In this way, the vehicle 100 perceives the boundaries of the physical object based on the contour and density of the data points 704.

Figure 8:
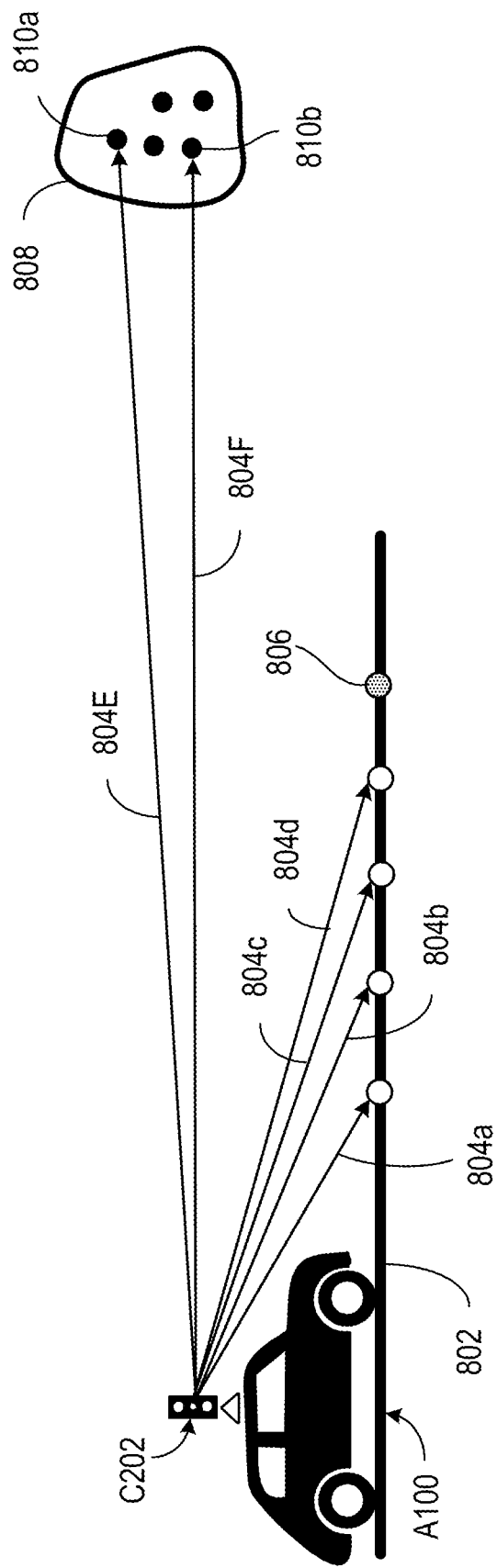
FIG. 8 shows the operation of the LiDAR system in additional detail.

FIG. 8 shows the operation of the LiDAR system 602 in additional detail. As described above, the vehicle 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the vehicle 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the vehicle 100 can determine that the object 808 is present.

Path Planning

Figure 9:
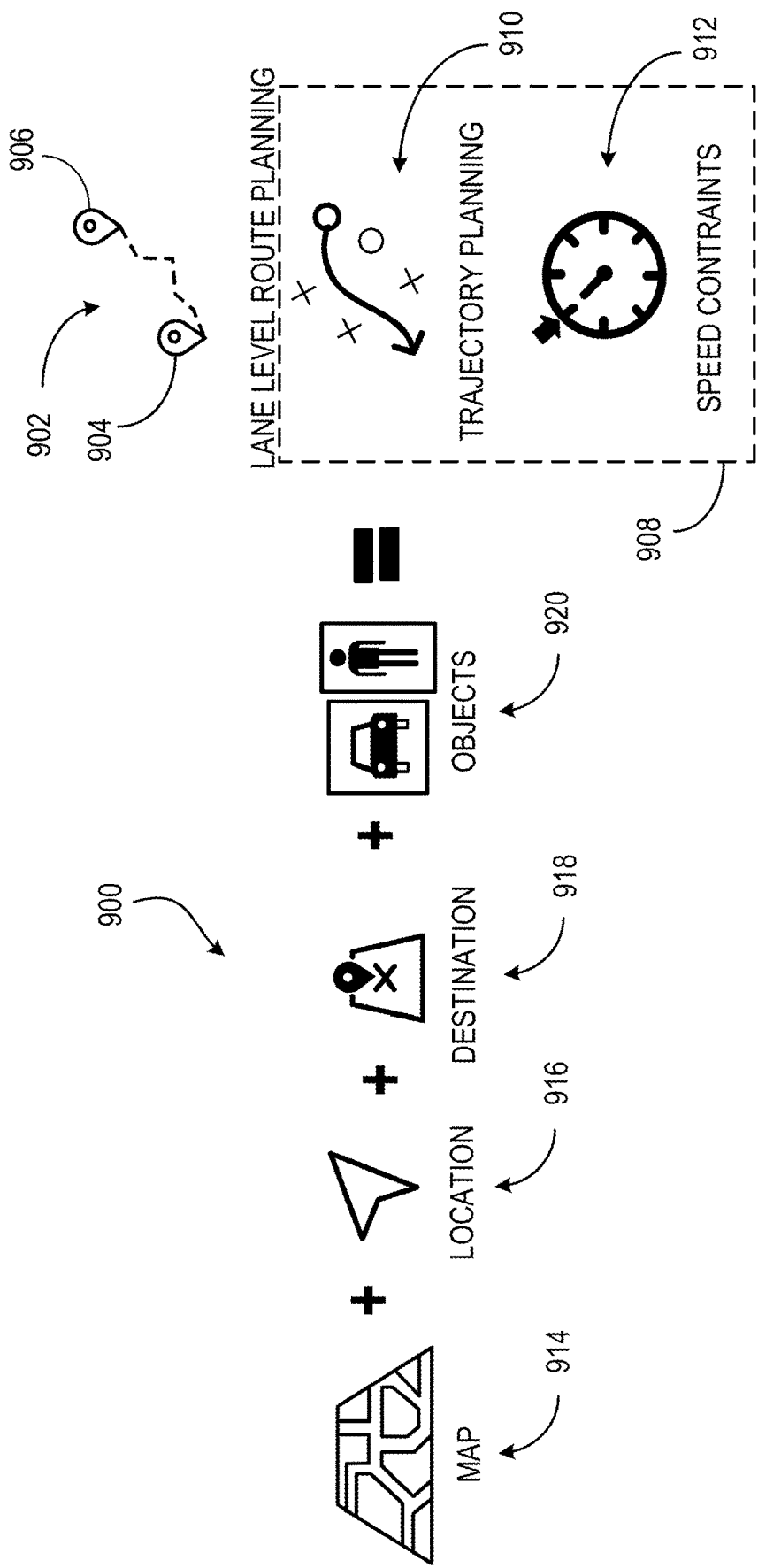
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the vehicle 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the vehicle 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the vehicle 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the vehicle 100, at least some of the rules will apply to the situation. A rule applies to a given situation if the rule has conditions that are met based on information available to the vehicle 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
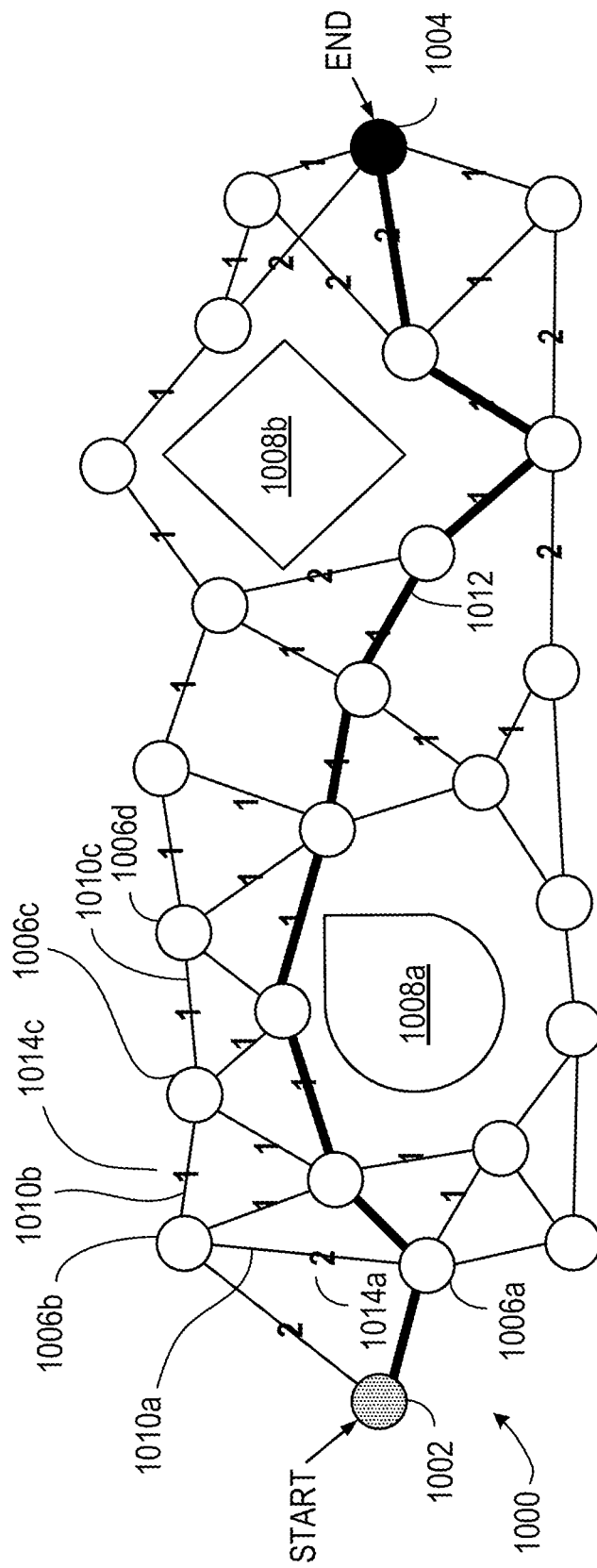
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by a vehicle 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road.

In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the vehicle 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the vehicle 100, e.g., other automobiles, pedestrians, or other entities with which the vehicle 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for a vehicle 100 to travel between one node 1006a and the other node 1006b, e.g., without having to travel to an intermediate node before arriving at the other node 1006b. (When we refer to a vehicle 100 traveling between nodes, we mean that the vehicle 100 travels between the two physical positions represented by the respective nodes.) The edges 1010a-c are often bidirectional, in the sense that and vehicle 100 travels from a first node to a second node, or from the second node to the first node. In an embodiment, edges 1010a-c are unidirectional, in the sense that an vehicle 100 can travel from a first node to a second node, however the vehicle 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the vehicle 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
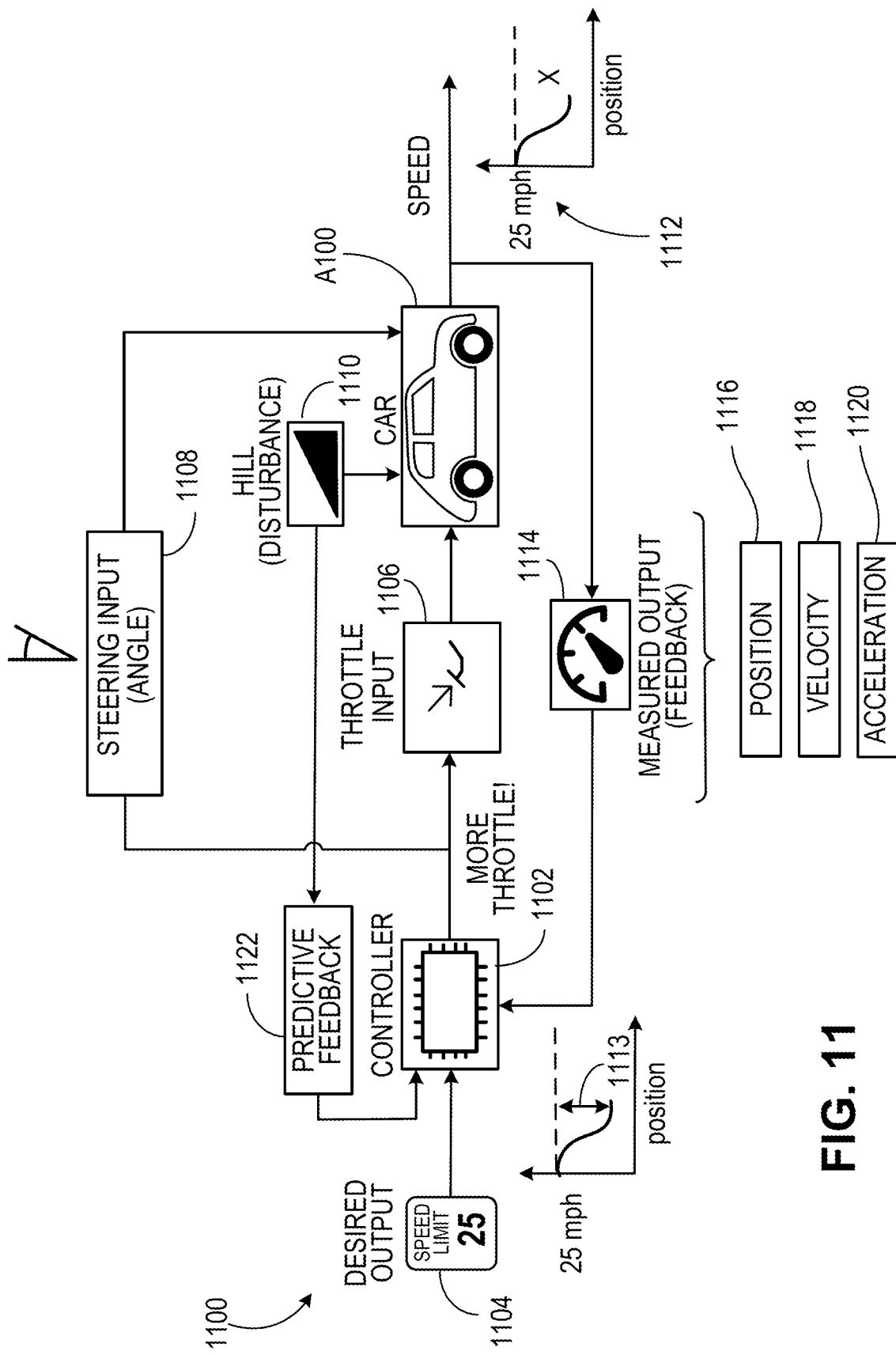
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an vehicle 100, e.g., by engaging the steering pedal, or engaging another throttle control, to achieve the desired output 1104. In some examples, the throttle input 1106 also includes data usable to engage the brake (e.g., deceleration control) of the vehicle 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the vehicle 100 encounters a disturbance 1110, such as a hill, the measured speed 1112 of the vehicle 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the vehicle 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the vehicle 100 detect ("see") a hill, this information can be used by the controller 1102 to prepare to engage the throttle at the appropriate time to avoid significant deceleration.

Figure 12:
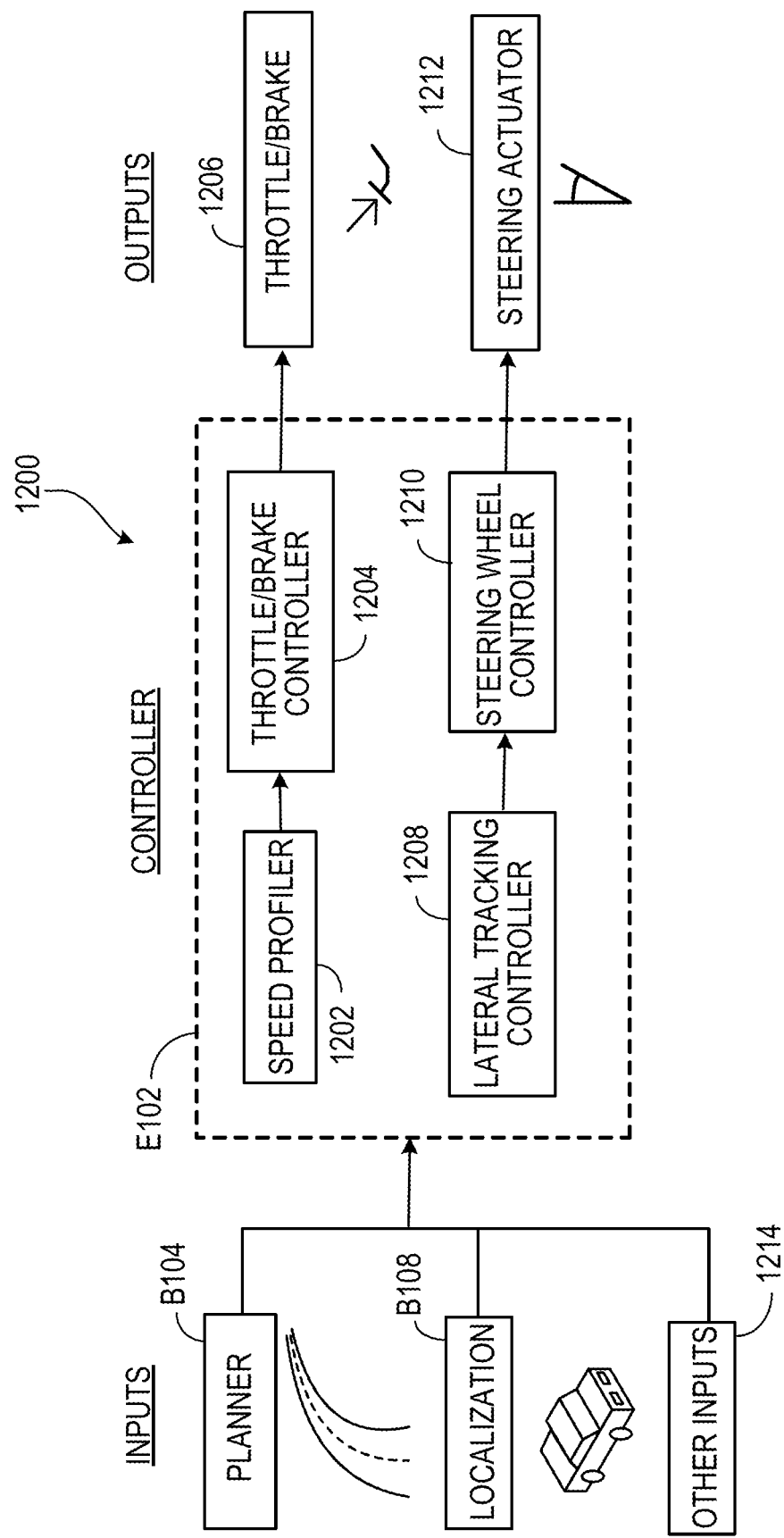
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the vehicle 100 begins operation and to determine which road segment to traverse when the vehicle 100 reaches an intersection. A localization module 408 provides information to the controller 1102 describing the current location of the vehicle 100, for example, so that the controller 1102 can determine if the vehicle 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Secure Booting of Vehicular Processors

Figure 13:
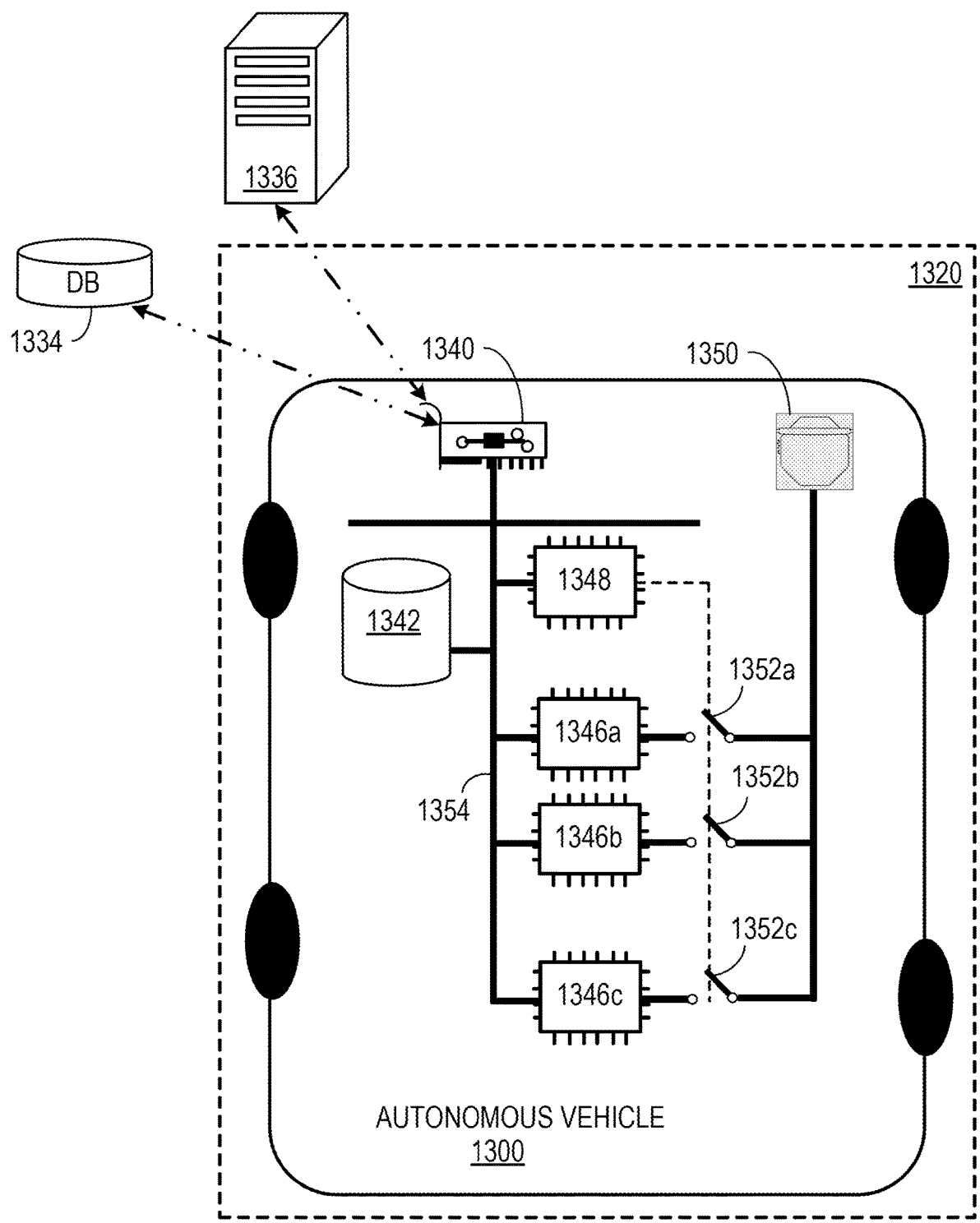
FIG. 13 shows an example of a secure booting system in a vehicle having autonomous capability.

FIG. 13 shows an example of a secure booting system in a vehicle 1300 having autonomous capability. An AV system 1320 of the vehicle 1300 includes a controller 1348; one or more computer processors, such as processors 1346a, 1346b and 1346c; local storage, such as data storage unit 1342; a power source 1350; switches, such as switches 1352a, 1352b and 1352c, connecting the power source 1350 to the processors; and communications devices 1340.

In some embodiments, the vehicle 1300 is an example of the vehicle 100, and the AV system 1320 is similar to the AV system 120. In such embodiments, the controller 1348 is similar to the controller 148; the processors 1346a, 1346b and 1346c are each similar to the processor 146; the data storage unit 1342 is similar to the data storage unit 142; the communication devices 1340 are similar to the communication devices 140; the server 1336 are similar to the servers 136; and the remotely located database 1334 is similar to the remotely located database 134. Accordingly, the operations of the AV system 1320 of the vehicle 1300 described in the following sections are applicable to the AV system 120 of the vehicle 100 in some embodiments. However, in other embodiments, the operations of the AV system 1320 are also applicable to AV systems other than the AV system 120.

The controller 1348 is instrumented to control the booting of the processors in the vehicle, such as processors 1346a, 1346b and 1346c. In an embodiment, the controller 1348 is a discrete embedded device in the vehicle 1300. For example, the controller 1348 can be an embedded microcontroller or a microprocessor. The controller 1348 is connected to the processors 1346a, 1346b and 1346c through a network connection 1354. In an embodiment, the network connection 1354 is a local area connection (LAN). The LAN can be, for example, an Ethernet LAN. Alternatively, the LAN can be a wireless LAN. The controller 1348 is also connected to local storage in the vehicle 1300, such as the data storage unit 1342.

The power source 1350 provides power to the processors 1346a, 1346b and 1346c. In an embodiment, the power source 1350 is a battery power source. In another embodiment, the power source 1350 is an engine that generates power by burning fuel. The power source 1350 is connected to the processors 1346a, 1346b and 1346c through respective switches 1352a, 1352b and 1352c. In an embodiment, one or more of the switches 1352a, 1352b or 1352c are solid state switches. In an embodiment, one or more of the switches 1352a, 1352b or 1352c are mechanical relays. In an embodiment, one or more of the switches 1352a, 1352b or 1352c have large capacitance values (e.g., in the order of 1 or 2 Farads or more), to limit current surges from the power source 1350 to the respective processors 1346a, 1346b and 1346c.

In an embodiment, the controller 1348 controls power cycling, e.g., turning ON or OFF, of the processors 1346a, 1346b and 1346c by controlling the state of the respective switches 1352a, 1352b and 1352c, e.g., switch closed or open.

The communications devices 1340 enable the AV system 1320 to communicate with external entities, such as remote server 1336, or a remotely located database 1334, or both. In an embodiment, the controller 1348 establishes network connections with the remote server 1336 or the remotely located database 1334, or both, through communication interfaces of the communication devices 1340. The network connections can be wired or wireless connections, e.g., as described with respect to communication devices 140. In an embodiment, the controller 1348 establishes a secure tunnel to the server 1336 or the database 1334, or both, over the network connections. For example, in an embodiment, the controller 1348 establishes a TCP/IP connection to the server 1336 that is secured using Secure Socket Layer (SSL) or Transport Layer Security (TLS) protocol. As described below, the controller 1348 obtains, from the server 1336 over the secure tunnel, boot files for the processors 1346a, 1346b and 1346c.

In an embodiment, when the vehicle 1300 is turned on, the controller 1348 manages booting the processors 1346a, 1346b and 1346c in a robust and secure manner. When the vehicle is turned on, the controller 1348 sends, to the server 1336, a request for most recent versions of boot files for the processors in the vehicle 1300, such as processors 1346a, 1346b and 1346c. The request includes an identifier for the vehicle 1300. The identifier can be, for example, a vehicle identification number (VIN) which is unique to the vehicle. In response to the request, the controller 1348 receives, from the server 1336, a manifest file that includes information about the most recent versions of boot files for the processors in the vehicle 1300. In an embodiment, the manifest file or the most recent versions of the boot files, or both, are received through the secure tunnel established with the server 1336. In addition to the manifest file, the controller 1348 also receives, from the server 1336, a blacklist of boot files for the processors, or a whitelist of boot files for the processors, or both (described in further detail below).

In an embodiment, a manifest file is a software file that describes the boot files for processors in a vehicle, such as vehicle 1300, how the boot files should be used, and a configuration for the operating platform for the AV system of the vehicle, e.g., AV system 1320. A manifest file includes, for each processor, a specific description of the software (e.g., boot files) to be run on the processor and how the software should be configured and executed. A manifest file for a vehicle accordingly specifies the entire software stack for the AV system of the vehicle. As described in the following sections, the controller is responsible for ensuring each processor is successfully powered on. Each processor uses the information in the manifest file to start the appropriate software.

In an embodiment, a manifest file is unique to a particular vehicle, e.g., mapped to the vehicle using the vehicle's VIN. Different vehicles have different manifest files, with the manifest file for a vehicle describing the boot files for the processors in the vehicle and the configuration for the AV system of the vehicle. In an embodiment, a manifest file is unique to a platform, with different manifest files being specified for different platforms. For example, vehicles can run their respective AV systems using Windows, Linux, Unix, Chrome OS, Android, MAC OS, iOS, or some other suitable operating system, with there being a manifest file for each operating system platform. Additionally or alternatively, a platform can specify a particular hardware configuration for the AV system of a vehicle. For example, different AV systems can have different processors, sensors, or other hardware, and have correspondingly different platforms. A platform can also represent a combination of hardware configuration and operating system software. Vehicles that have the same platform can have the same manifest file, but different from vehicles with a different platform. This can be the case, for example, when the hardware and software configuration of vehicles running the same AV system platform are similar, but vary from one platform to another.

A manifest file includes a version number that identifies a specific instance of the manifest file. In an embodiment, the version number is non-decreasing, e.g., with every update to the information in the manifest file, the version number of the manifest file is increased. A manifest file is updated when one or more boot files specified in the manifest file is added, removed, or modified, when an order of execution of the boot files specified in the manifest file is changed, or when additional information included in the manifest file is changed, or any combination of these.

In an embodiment, a manifest file includes separate docker containers for every processor in the vehicle or the platform corresponding to the manifest file, with each docker container packaging boot files for the corresponding processor. In this context, a docker container is a bootable software package for a processor. In the following sections, references to a docker container and to boot files are used interchangeably, as referring to the boot files for a processor.

In an embodiment, the boot files for a processor include a kernel or operating system image for the processor, which specifies the basic operating system software executables for bringing up the processor in an operational state. In an embodiment, the boot files for a processor include application software to be executed by the processor, e.g., software to perform various functions for the vehicle's AV system, such as perception software to manage one or more sensors, control software for controlling steering or braking, among others.

In an embodiment, a docker container is associated with a particular processor using an identifier that is unique to the processor. For example, in an embodiment, each processor in an AV system has a unique network address, such as an Ethernet medium access control (MAC) hardware address or a static Internet Protocol (IP) address. In this case, the configuration information included in the manifest file specifies which docker container in the manifest file is intended for which network address in the AV system. Different processors have different docker containers that are distinctly separated from one another in the manifest file.

In an embodiment, a blacklist of boot files is an electronic file that identifies one or more boot files, or particular versions of boot files, that are not to be used to boot the corresponding processors. The identified files can be, for example, versions of boot files that were previously compromised in security attacks from adversaries, or are vulnerable to compromise, or specify incorrect hardware or software parameters, or any suitable combination of these.

In an embodiment, a whitelist of boot files is an electronic file that identifies one or more boot files, or particular versions of boot files, that are approved to be used to boot the corresponding processors. The identified files can be, for example, versions of boot files that have been tested to be robust to withstand security attacks from adversaries, or specify desired values of hardware or software parameters for the correct operation of the processors, among others.

In an embodiment, the server 1336 digitally signs each boot file using cryptographic authentication keys, and includes the digital signature with the corresponding boot file in the respective docker container. Each processor authenticates the digital signature for a boot file before executing the boot file. In an embodiment, the server 1336 uses different authentication keys for signing boot files for different processors. For example, server 1336 can use a first authentication key for signing boot files for the processor 1346*a*, a different authentication key for signing boot files for the processor 1346*b*, and another third authentication key for signing boot files for the processor 1346*c*.

In an embodiment, the server 1336 uses a common class authentication key to sign boot files for processors of a particular type or class, there being different class authentication keys for processors of different types or classes. For example, processor 1346*a* can belong to a class of processors that are used to control steering for their respective vehicles, with processor 1346*a* being used to control steering for the vehicle 1300. In contrast, processor 1346*b* can belong to a class of processors that are used to control braking for their respective vehicles, with processor 1346*b* being used to control braking for the vehicle 1300; while processor 1346*c* can belong to a class of processors that are used to manage a specific sensor for their respective vehicles, with processor 1346*c* being used to manage the specific sensor for the vehicle 1300. In such a case, the server 1336 can use a first class authentication key to sign boot files for the class of processors that are used to control steering for their respective vehicles, such as processor 1346*a* in vehicle 1300 and other steering control processors in other vehicles. The server 1336 further use a second class authentication key to sign boot files for the class of processors that are used to control braking for their respective vehicles, such as processor 1346*b* in vehicle 1300 and other braking control processors in other vehicles; and a third class authentication key to sign boot files for the class of processors that are used to manage the specific sensor for their respective vehicles, such as processor 1346*c* in vehicle 1300 and other sensor control processors in other vehicles.

In an embodiment, the server 1336 also digitally signs the blacklist or the whitelist, or both, using respective cryptographic authentication keys, and includes the corresponding digital signature with respective list in the manifest file.

Each processor in a vehicle stores one or more authentication keys to verify the digital signatures on the corresponding boot files, and the blacklist or the whitelist, or both. For example, in an embodiment, the processors store corresponding class authentication keys for the respective boot files, and also authentication keys for the blacklist, the whitelist or both. In an embodiment, the server 1336 shares the class authentication key and the blacklist/whitelist authentication key, with each processor using a key exchange mechanism. For example, the server 1336 sends the authentication keys to the processors in a vehicle in encrypted form using key encryption keys (KEKs), which are, e.g., cryptographic keys that are used to encrypt other cryptographic keys. The server uses the KEKs for sending the initial values of the authentication keys in encrypted form, and for any subsequent updates to the values of the authentication keys.

In an embodiment, the server 1336 uses public key cryptography for KEKs. For example, the server can use 2048-bit or 4096-bit Rivest-Shamir-Adleman public key protocol (RSA 2048 or RSA 4096). In such cases, the server 1336 encrypts the authentication keys using a private key that is known only to the server, with the corresponding public key being known to the processors. Upon receiving the encrypted communication, e.g., through the secure tunnel over the network connection path using the communication devices 1340, a processor can unencrypt using the corresponding public key, and retrieve the class authentication key, and the blacklist or whitelist key, or both. In an embodiment, the server 1336 uses different KEKs, e.g., different public/private key pairs, for different classes of processors, and also use different KEKs for the blacklist and the whitelist. In such cases, each processor knows the public key corresponding to its own class, and the public keys for the blacklist and the whitelist. Accordingly, each processor can obtain the class authentication key for its own class, apart from the blacklist and the whitelist authentication keys.

Reverting to FIG. 13, upon receiving the manifest file from the server 1336, the controller 1348 checks the manifest file and determines whether the most recent versions of the boot files for the processors in the vehicle 1300 are available locally, e.g., stored in the data storage unit 1342. This can be the case, for example, when there has been no change to the boot files since the last time the controller 1348 had fetched the boot files from the server 1336. If the controller 1348 determines that the most recent versions of the boot files for the processors in the vehicle 1300 are available locally, then the controller retrieves the most recent versions of the boot files from local storage, e.g., from the data storage unit 1342, and proceeds to boot the processors using the retrieved boot files. On the other hand, if the controller 1348 determines that the most recent versions of the boot files for the processors in the vehicle 1300 are not available locally, e.g., if the server 1336 has updated the boot files for the processors since the last time the controller 1348 had fetched the boot files from the server 1336, then the controller 1348 obtains the most recent versions of the boot files from the server 1336. In an embodiment, the controller 1348 fetches the most recent versions of the boot files directly from the server 1336. In another embodiment, the controller 1348 fetches the most recent versions of the boot files from a remote network storage, e.g., database 1334. The location of the boot files in the database 1334 is either indicated by the server 1336, e.g., in response to a request for the boot files, or specified in information included in the manifest file. The controller 1348 saves the most recent versions of the boot files that it receives from the server 1336 in local storage, e.g., in data storage unit 1342, and proceeds to boot the processors using the newly fetched boot files.

In an embodiment, the controller 1348 cannot communicate with the server 1336 when the vehicle 1300 is turned on, e.g., because the network connection between the communication devices 1340 and the server 1336 is down. In this case, when the controller 1348 does not receive a response from the server 1336 within a specified time period, the controller 1348 boots the processors using boot files that are available in local storage, e.g., in data storage unit 1342. At a later time, when the network connection with the server 1336 is reestablished, the controller 1348 fetches the most recent versions of the boot files from the server 1336, saves the most recent versions of the boot files in local storage, and proceeds to reboot the processors using the newly fetched boot files.

In an embodiment, the controller 1348 boots the processors 1346*a*, 1346*b* and 1346*c* when the vehicle 1300 is stationary at a designated safe location. The designated safe location can be a home location of the vehicle, e.g., a garage or a parking lot, where the vehicle usually stays for extended periods when not in use. In an embodiment, the designated safe location specified for the vehicle stored in the vehicle's memory, e.g., in the data storage unit 1342, and is known to the controller 1348. When the vehicle powers on, the controller 1348 checks whether it is at the designated safe location before fetching the manifest file and new boot files from the server 1336. If the vehicle is not at the designated safe location, then the controller 1348 boots the processors using boot files that are cached in memory, e.g., by using the boot files stored in data storage unit 1342.

In an embodiment, upon receiving the manifest file from the server 1336, the controller 1348 checks the version number noted in the manifest file, before using the manifest file to boot the processors. The controller 1348 maintains a counter that stores the value of the most recent version of the manifest file that the controller 1348 has previously received from the server 1346. In an embodiment, the counter is embedded in hardware, e.g., a register in the controller 1348, a one-time programmable memory inside the controller chip package, or a trusted platform module (TPM) chip in the AV system 1320. In this context, a TPM chip is a specialized chip that stores cryptographic keys and/or other security information specific to the host system for hardware authentication. For example, in an embodiment, each TPM chip stores the class authentication key for the corresponding processor, the KEKs and the counter value. The keys and counter value are maintained inside the chip and cannot be accessed by external software. In other embodiments, the counter is a software counter, e.g., a data structure that stores the counter value in local memory of the vehicle 1300, such as in data storage unit 1342.

If the version value noted in the manifest file newly received from the server 1336 is less than the version value stored in the controller's counter, the newly received manifest file is older than the most recent version previously received from the server 1336. This can be the case, for example, if the manifest file is corrupted in some manner. Alternatively, this can be symptomatic of a rollback attack from an adversary. For example, an adversary who previously obtained (e.g., by eavesdropping) an older version of the manifest file that has security vulnerabilities attempting to force the controller to use the older manifest file, so that the adversary can exploit the security vulnerabilities. In such cases, the controller 1348 rejects the newly received manifest file. In an embodiment, the controller 1348 also notifies the server 1336, e.g., by sending an alert message to the server indicating a possible breach in security. A server administrator who manages the manifest file or boot files, or both, can take corrective actions upon receiving the alert message.

If the version value noted in the newly received manifest file is same as the version value stored in the controller's counter, the newly received manifest file is same as the most recent version previously received from the server 1336 and used as the basis for current configuration of the AV system 1320. This can be the case, for example, if there is no change in the manifest file at the server 1336. In such cases, the controller 1348 boots the processors in the vehicle 1300 using the boot files received in the last round, which are stored in local memory, e.g., in data storage unit 1342.

If the version value noted in the newly received manifest file is greater than the version value stored in the controller's counter, the newly received manifest file is more recent than the most recent version previously received from the server 1336, indicating that the server 1336 has updated the configuration for the vehicle 1300 since the last change known to the controller 1348. In such cases, the controller 1348 accepts the newly received manifest file and examines the information included in the new manifest file. The controller 1348 also updates the value of its counter to be same as the version number indicated by the newly received manifest file. In this manner, by accepting manifest files with non-decreasing version numbers, the controller 1348 ensures that rollback attacks are prevented.

In an embodiment, upon accepting a new manifest file, the controller 1348 reads the manifest file and determines that the specified versions of boot files are consistent with one another, e.g., can run in concert with one another. This check can prevent attacks in which an adversary rolls back one boot file, e.g., specifies an earlier vulnerable version. The consistency check by the controller will prevent the earlier version from running. If the consistency check is successful, the controller further checks, for each docker container, if the specified version of the boot files are already locally available, e.g., fetched from the server 1336 during a previous exchange and stored in the data storage unit 1342. For boot files that are locally available, the controller 1348 retrieves the files from local storage. For boot files that are not locally available, e.g., the versions specified in the manifest file are more recent than local versions or new boot files, the controller fetches the files from the server 1336, downloading these files over the secure tunnel. The controller then boots the processors, providing to each processor the respective boot files.

In an embodiment, the controller 1348 boots the processors in sequence. For example, the controller 1348 toggles the switch 1352a to a closed state to power on the processor 1346a, and sends to the processor 1346a the docker container with the boot files intended for the processor. After powering on the processor 1346a, the controller 1348 toggles the switch 1352b to a closed state to power on the processor 1346b, sending to the processor 1346b the docker container with the boot files intended for the processor. Subsequently, the controller 1348 toggles the switch 1352c to a closed state to power on the processor 1346c, sending to the processor 1346c the docker container with the boot files intended for the processor. However, in another embodiment, the controller 1348 boots the processors concurrently. In such cases, the controller 1348 toggles the switches 1352a, 1352b and 1352c, to a closed state at the same time. As each processor is powered on, the controller 1348 sends to the processor the respective docker container with the boot files intended for the processor.

In an embodiment, after sending the respective docker container to a processor, the controller 1348 waits to receive an indication that the processor is successfully booted. For example, the controller waits for an acknowledgement message from the processor that indicates that the processor has successfully executed the boot files in the docker container.

If the controller 1348 does not receive an acknowledgement message from the processor with a specified timeout period, the controller power cycles the processor, e.g., by toggling the corresponding switch to open and then back to closed, in an attempt to restart the processor. In an embodiment the specified timeout period is in the order of several microseconds or seconds.

In an embodiment, the controller 1348 power cycles a nonresponsive processor repeatedly a specified number of times, e.g., 3, 4, or 5 times. As noted previously, the switches connecting the processors to the power source 1350 have high capacitance values, which limit any power surge to the processors. Accordingly, the risk of damaging a processor due to a current surge upon repeated power cycles is contained. If the controller does not receive an acknowledgement from the processor after the specified number of attempts, then the controller deems that the processor has suffered a hardware failure.

In an embodiment, the controller 1348 powers on successive processors in the sequential order even as it waits to receive an acknowledgement from a processor that was connected to the power source 1350 earlier in the sequence. For example, the controller 1348 can connect the processor 1346b to the power source 1350 even as the controller is waiting to receive an acknowledgement message from the processor 1346a. In such cases, the processor 1346b may complete its booting up before another processor that was powered on earlier in the sequence, e.g., processor 1346a. However, in another embodiment, the controller 1348 waits to receive an acknowledgement from a processor before it proceeds to power on subsequent processors in the sequential order. In such cases, the controller 1348 moves to the next processor only upon receiving an acknowledgement message from the most recent processor to be powered on, or after deeming the most recent processor as experiencing hardware failure following the specified number of attempts at powering on the processor.

Turning to the processors in the vehicle 1300, e.g., processors 1346a, 1346b and 1346c, each processor, after successfully booting, pings the controller 1348, e.g., by sending an acknowledgement message as described above. In an embodiment, the communication between the processors and the controller 1348 over the LAN 1354 is encrypted. For example, in some cases, the messages exchanged between the controller 1348 and the processors 1346a, 1346b and 1346c are encrypted using SSH and a suitable public key cryptography standard (PKCS), such as PKCS version 11 (PKCS #11).

After a processor is powered on, the processor receives a docker container from the controller that is specific to the processor. For example, each docker container is tagged with a unique network identifier of the corresponding processor, as described previously. The processor also receives the blacklist or the whitelist, or both, from the controller 1348, along with the respective digital signatures. In an embodiment, each processor is a thin client, e.g., a processor does not have any long term local storage even if the processor has temporary cache memory. In such cases, a processor can perform its designated functions only upon receiving the boot files from another source, e.g., the controller 1348, and executing the boot files.

Upon receiving the docker container with the boot files and the blacklist or the whitelist, or both, a processor authenticates each boot file by verifying the digital signature sent with the boot file. In an embodiment, the boot files for a processor are common to the particular class to which the processor belongs. For example, the processor 1346a can belong to the class of processors used to control steering for their respective vehicles, such that the processor 1346a can authenticate the digital signature on the boot files it receives from the controller 1348 using the class authentication key for the steering control class of processors. In an embodiment, the class authentication keys for the processors in the vehicle 1300, the authentication keys for the blacklist and the whitelist, and other cryptographic keys such as KEKs, are stored in secure storage in the vehicle 1300, e.g., a trusted platform module (TPM) chip. Upon powering on, a processor retrieves its class authentication key and the authentication keys for the blacklist and the whitelist from the secure storage. Using the class authentication key, the processor verifies the digital signatures on the boot files in the docker container that have been signed by the server 1336, as noted previously. The processor determines that the boot files are authentic if the corresponding digital signatures are verified as having been signed by a trusted entity, such as the server 1336 or a trusted authority. In this context, a trusted authority is a third party entity, such as a Certificate Authority, that is involved in cryptographic operations and is trusted by the other entities in the system, such as the server 1336, the controller 1348 and the processors 1346a, 1346b and 1346c. For example, the trusted authority facilitates interactions between other parties, such as the server 1336 and the controller 1348, who both trust the third party. The trusted authority can review and verify transaction communications between the parties. The relying parties use this trust to secure their own interactions.

In addition, the processor checks whether any boot file is included in the blacklist. Before using the blacklist, the processor verifies the digital signature for the blacklist (and/or the whitelist) using the corresponding authentication key by applying known cryptographic signature verification techniques.

If a boot file is verified as authentic and the boot file (e.g., the particular version of the boot file in the docker container) is not specified in the blacklist, then the processor executes the boot file. If either a boot file cannot be verified as authentic, e.g., its signature cannot be verified, or the boot file is specified in the blacklist, then the processor rejects the boot file instead of executing the boot file. The processor performs this signature verification and blacklist lookup for every boot file before executing the file. In an embodiment, the initial checks performed by a processor upon powering on, including, e.g., authenticating boot files using cryptographic keys and exchange of authentication keys using KEKs, follows the Unified Extensible Firmware Interface (UEFI) standard. In such cases, the UEFI standard enables remote diagnostics and repair of components of the AV system 1320, such as one or more of the processors 1346a, 1346b and 1346c, even with no operating system installed. For example, an operator, such as an administrator of the server 1336, can diagnose and repair the AV system 1320 remotely.

In an embodiment, a processor verifies authenticity of the boot files and executes the boot files in an atomic operation. In such cases, the processor executes a boot file as the immediate next operation upon verifying its authenticity and determining that it is not in the blacklist, without any unrelated intervening operation. Such verification and execution in an atomic operation ensures that there is no possibility of corruption of a boot file due to a gap between the time its authenticity is verified and the time when it is executed.

In an embodiment, in addition to verifying authenticity of each boot file and checking the blacklist, a processor also checks whether each boot file, or the received version of each boot file, is specified by the manifest file. In such cases, the processor executes a boot file only if the boot file is specified by the manifest file, but rejects the boot file if the file is not specified by the manifest file.

In an embodiment, multiple manifest files are used to configure processors running on a platform, e.g., the processors 1346a, 1346b and 1346c in the AV system 1320. In such cases, different manifest files can specify boot files directed towards separate functionalities of the processors. For example, the controller 1348 can initially receive a hardware manifest file, e.g., which specifies boot files that are responsible for core platform bring up, such as initialization of the processors 1346a, 1346b and 1346c, initialization of sensor drivers or interfaces, or verification of platform health of the AV system 1320, among other functions. The hardware manifest file can include links for one or more higher layer manifest files, e.g., manifest files corresponding to application-level functionalities, such as autonomous driving, sensor data gathering, performing simulated testing for the one or more processors, among other functionalities. In an embodiment, the hardware manifest includes a completion criterion to trigger launch of the higher layer manifest files. Once the core platform boot files are successfully executed to bring up the processors 1346a, 1346b and 1346c, the completion criterion is triggered, which prompts the controller 1348 to fetch application level manifest files from the server 1336.

The hardware manifest file or the application manifest file, or both, can include links for additional manifest files that are triggered after the application manifest file has been processed. The additional manifest files can include manifest files for other types of applications. In an embodiment, different manifest files include triggers for different types of manifest files, or a different order of execution of manifest files, depending on the platform or an objective of using a vehicle. In an embodiment, a manifest file can include instructions that block another manifest file from running, depending on certain criteria. For example, a manifest file can include boot files to configure a processor for certain applications. This manifest file can block another manifest file that includes boot files to configure the same processor for a different set of applications.

In an embodiment, a new vehicle can be shipped empty, e.g., without any specific configuration of its AV system software, except a ship layer manifest file that is used to initialize the basic operation of the AV system, e.g., enabling the controller to establish a communication with the server 1336. When the vehicle reaches the destination and is powered on, the controller executes the ship layer manifest file, which includes triggers that prompt the controller to fetch from the server 1336 other manifest files used to configure the AV system of the vehicle.

In the above manner, the processors in a vehicle, e.g., processors 1346a, 1346b and 1346c in the vehicle 1300, are securely booted using a controller on board the vehicle, e.g., controller 1348, to manage the boot process using manifest files obtained from a server, e.g., server 1336. In an embodiment, the server 1336 stores and manages manifest files for a fleet of vehicles. The fleet includes a plurality of vehicles that are grouped into one or more collections depending the AV system platforms. For example, the fleet can include a collection of vehicles that use Windows operating system for their AV systems, and another collection of vehicles that use Linux operating system for their AV systems. Additionally or alternatively, the fleet can include a collection of vehicles that have a particular hardware configuration, e.g., a specific set of processors and sensors, and another collection of vehicles that have a different hardware configuration, irrespective of the operating system software used by each collection. In an embodiment, all vehicles in a collection that use the same hardware are identical from a software perspective, e.g., their AV systems run the same software release, thereby ensuring consistency for the vehicles in the collection.

Figure 14:
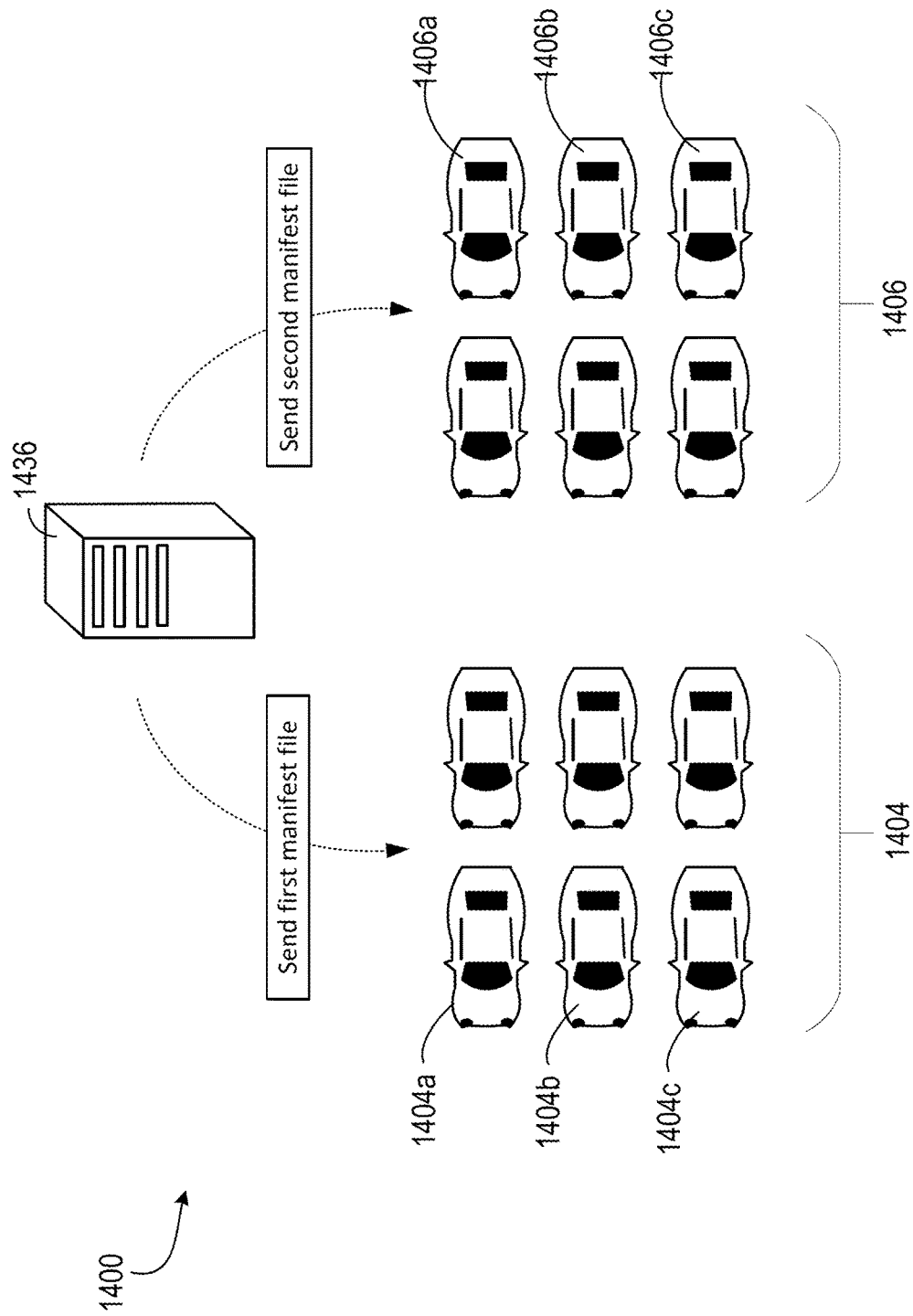
FIG. 14 shows an example of a system in which a centralized server manages distribution of manifest files for a fleet of vehicles.

In an embodiment, the server is in a location that is accessible by all the vehicles in the fleet over network connections, e.g., a network connection using the communication devices 1340 of the vehicle 1300. As an example, FIG. 14 shows a system 1400 in which a centralized server 1436 manages distribution of manifest files for a fleet of vehicles. The fleet includes a first collection 1404 of vehicles, such as vehicles 1404a, 1404b and 1404c; and a second collection 1406 of vehicles, such as vehicles 1406a, 1406b and 1406c. The fleet can also include additional collections of vehicles. Although a single server 1436 is shown, in an embodiment, a collection of servers that are similar to the server 1436 are used to manage manifest files for the fleet.

In some embodiments, the server 1436 is similar to the server 1336, and one or more of the vehicles 1404a, 1404b, 1404c, 1406a, 1406b or 1406c is similar to the vehicle 1300. Accordingly, the operations of the server 1346 described in the following sections are applicable to the server 1336 in some embodiments. However, in other embodiments, the operations of the server 1436 are also applicable to other servers.

In an embodiment, a fleet of vehicles is controlled, operated and/or maintained by one entity, with different fleets being managed by different entities. For example, several different business entities can each operate one or more autonomous vehicles in a particular region. The server 1436 can coordinate the operation of the autonomous vehicles across each of the fleets (e.g., to update the software for the AV systems or automatically assign tasks to each of the vehicles).

In an embodiment, the vehicles in a collection run similar software, configured using manifest files that are similar for all the vehicles in the collection. Vehicles in different collections can run different software, configured using different manifest files. In an embodiment, a manifest file for a particular collection, e.g., collection 1404, specifies at least one boot file that is different from those specified by a manifest file for any other collection, e.g., collection 1406. In an embodiment, a manifest file for a particular collection, e.g., collection 1404, specifies an order of execution of boot files that is different from an order of execution of boot files specified by a manifest file for any other collection, e.g., collection 1406.

The server 1436 generates the manifest files for the vehicles in the fleet. In an embodiment, an operator, e.g., an administrator of the fleet, controls the server to prepare and distribute manifest files for different collections of vehicles depending on the operational requirements of the vehicles in the collections. In an embodiment, the instructions from the operator to the server 1436 include information about the configuration of the target platform, the specification of boot files, or an order of execution of the boot files by one or more processors in the platform.

Manifest files are also updated from time to time, e.g., new versions of one or more boot files to add new features or security patches, to add new boot files or to remove existing boot files. For example, in an embodiment, the operator sends additional instructions to the server 1436 to update an existing manifest file, with the additional instructions including information about a reconfiguration of the target platform, updated specification of one or more boot files, or an updated order of execution of the boot files by the one or more processors in the platform.

In an embodiment, when a new manifest file is generated, or an existing manifest file is updated, the server 1436 sends a notification to the vehicles that use the impacted manifest file. For example, the operator can generate or update a manifest file for the collection 1404. Upon doing so, the operator controls the server 1436 to send a notification to the vehicles in the collection 1404, e.g., vehicles 1404a, 1404b and 1404c, that an updated manifest file or a new manifest file is available. In an embodiment, the notification is broadcast to all the vehicles in the collection. The notification is received by the controller in each vehicle, e.g., controller 1348 in vehicle 1300, which then proceeds to update the AV system software of the vehicle by fetching the manifest file from the server, e.g., as described with respect to FIG. 13.

In an embodiment, the controller in a vehicle does not update the AV system software immediately upon receiving the notification, but at a later time, e.g., when the vehicle is at a designated safe location. For example, a vehicle in the collection 1404 can receive the notification from the server 1436 at a time when the vehicle is moving on a road. In some cases, upon receiving the notification, the vehicle pulls up to the side of the road and then proceeds to update the system software by fetching the manifest file from the server. In some cases, the controller in the vehicle records the notification and fetches the manifest file later, e.g., when the vehicle is at a designated safe location.

In an embodiment, controllers in multiple vehicles update their respective software at the same time upon receiving the notification from the server 1346. In an embodiment, the server staggers updates to subsets of vehicles within a collection or a fleet, to avoid all vehicles being out of operation at the same time as their respective AV system software gets updated. For example, the operator can update respective manifest files for the collections 1404 and 1406 at around the same time. However, a notification is sent to vehicles in the collection 1404 at a first time, while a notification is sent to vehicles in the collection 1406 at a second time that is different. In doing so, updates to the vehicles in the collection 1404 can be triggered at a different time (e.g., first time) compared to updates to vehicles in the collection 1406 (e.g., second time). In an embodiment, such staggered updates are performed for vehicles within a collection itself. For example, the server 1346 can notify vehicles 1404a and 1404b at a time that is different from the time when the server notifies vehicle 1404c.

In the above manner, by sending notifications to trigger updates to groups of vehicles at a time, the system 1400 can be used to batch process multiple vehicles with similar configurations, while vehicles with different configurations can be processed separately. Since the manifest file for a vehicle specifies the software stack for the AV system of the vehicle, an operator can use the server 1436 to maintain centralized control over the software running on each vehicle in the fleet. The system accordingly provides a robust and secure manner to manage vehicles in the fleet, avoiding the risk of any vehicle getting into a misconfigured platform state, which can happen, e.g., due to human error or discrepancy with manual updates. The system also provides scalable software deployment across the fleet, allowing the operator to configure groups of vehicles in a consistent manner or easily change what software is running on the vehicles from a central location, without requiring specialized technical knowledge or skillset for different vehicles in the fleet.

Example Processes for Securely Booting Vehicular Processors

Figure 15:
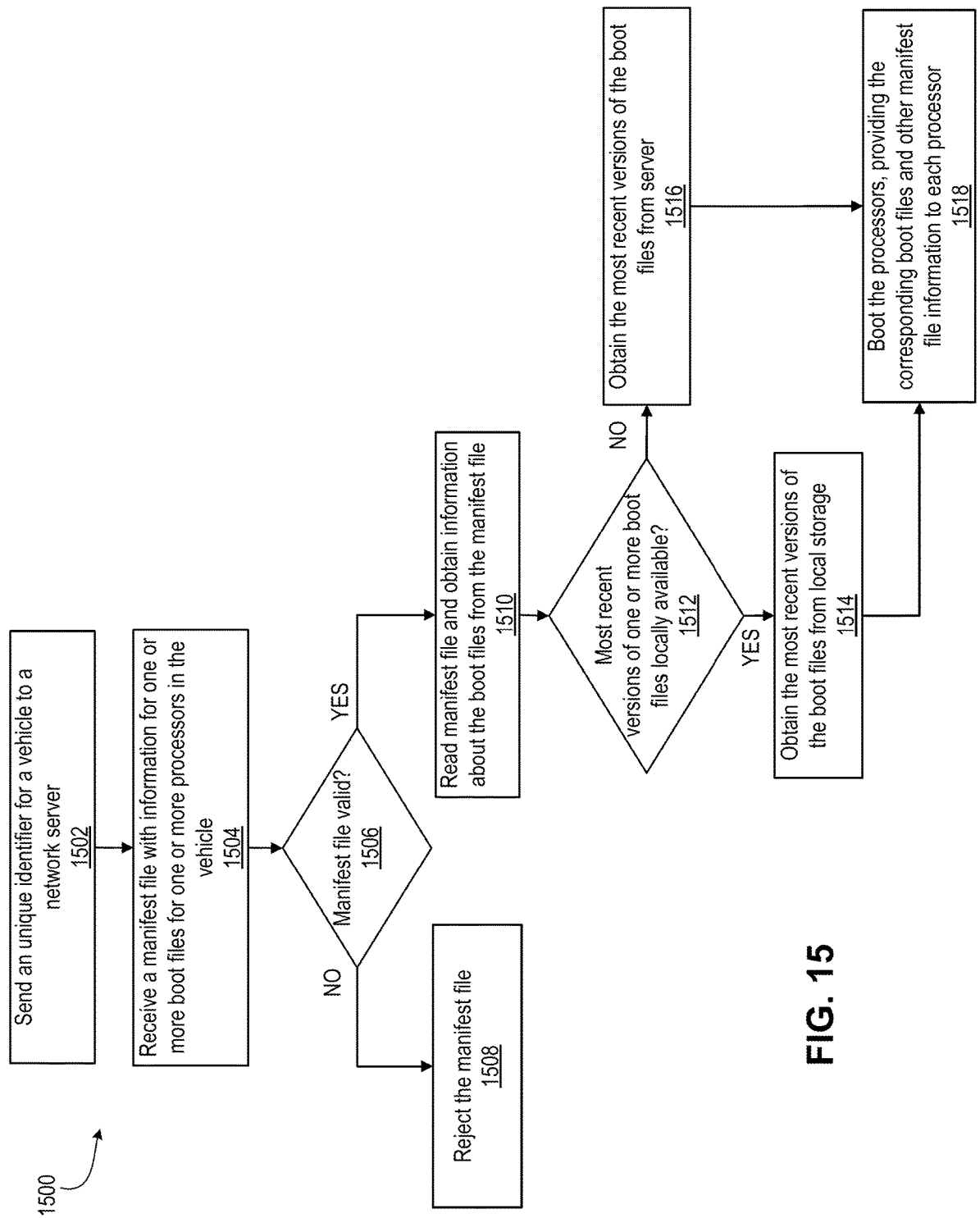
FIGS. 15-18 are flow chart diagrams showing example processes for securely booting vehicular processors.

FIG. 15 shows an example process 1500 for controlling secure booting of vehicular processors. The process 1500 is performed, at least in part, using one or more of the systems described herein (e.g., using one or more computer systems, AV systems, autonomous vehicles, among others). In an embodiment, the process 1500 is performed by the controller 1348 to securely boot one or more processors in the vehicle 1300 (FIG. 13), such as one or more of processors 1346a, 1346b and 1346c. Accordingly, the process 1500 is described in the following sections with respect to the controller 1348. However, the process 1500 can also be performed by other devices.

In the process 1500, a controller sends a unique identifier for a vehicle to a network server (1502). For example, when the vehicle 1300 is powered on, the controller 1348 sends the VIN for the vehicle 1300 to the server 1336.

The controller receives a manifest file with information for one or more boot files for one or more processors in the vehicle (1504). For example, upon sending the VIN number of the vehicle 1300 the server 1336, the controller 1348 receives, from the server 1336, a manifest file that specifies the software configuration for the AV system 1320 of the vehicle 1300. The manifest file includes information one docker containers for the processors in the vehicle 1300, e.g., processors 1346*a*, 1346*b* and 1346*c*, with each docket container being a software package having the boot files for the respective processor.

The controller determines whether the manifest file is valid (1506). For example, the controller 1348 compares the version number of the manifest file with a value of a version counter of the controller.

If the controller determines that the manifest file is not valid, then the controller rejects the manifest file (1508). For example, if the version number of the manifest file is less than the value of the version counter of the controller, then the controller 1348 determines that the manifest file is an old manifest file that should not be used. Accordingly, the controller 1348 rejects the manifest file. In an embodiment, the controller sends a notification to the server 1336 about the rejection.

On the other hand, if the controller determines that the manifest file is valid, then the controller reads the manifest file and obtains information about the boot files from the manifest file (1510). For example, if the version number of the manifest file is greater than the value of the version counter of the controller, then the controller 1348 accepts the manifest file as a valid new manifest file and processes the file. The controller updates the value of its version counter to the version of the manifest file and examines the docker containers in the manifest file to obtain the version numbers of the corresponding boot files. The controller checks the version numbers to ensure that the boot files are consistent with one another.

The controller determines whether most recent versions of one or more boot files are locally available (1512). For example, the controller 1348 checks whether the most recent versions of the boot files in the docker containers are already present in local storage, e.g., data storage unit 1342.

If the most recent versions of one or more boot files are locally available, then the controller obtains the most recent versions of the boot files from local storage (1514). For example, if the controller 1348 determines that versions of one or more boot files in the docker containers are present in local storage, e.g., data storage unit 1342, the controller obtains these boot files from the local storage.

If the most recent versions of one or more boot files are not locally available, then the controller obtains the most recent versions of the boot files from the server (1516). For example, if the controller 1348 determines that versions of one or more boot files in the docker containers are not locally available, then the controller fetches these versions of the boot files from the server 1336, e.g., through a secure tunnel.

The controller boots the processors, providing the corresponding boot files and other manifest file information to each processor (1518). For example, the controller 1348 powers on the processors 1346*a*, 1346*b* and 1346*c* in sequence. As each processor is powered on, the controller 1348 provides, to the processor, the docker container specified for the processor, along with other information from the manifest file that is used by the processor, such as the blacklist or the whitelist, or both.

Figure 16:
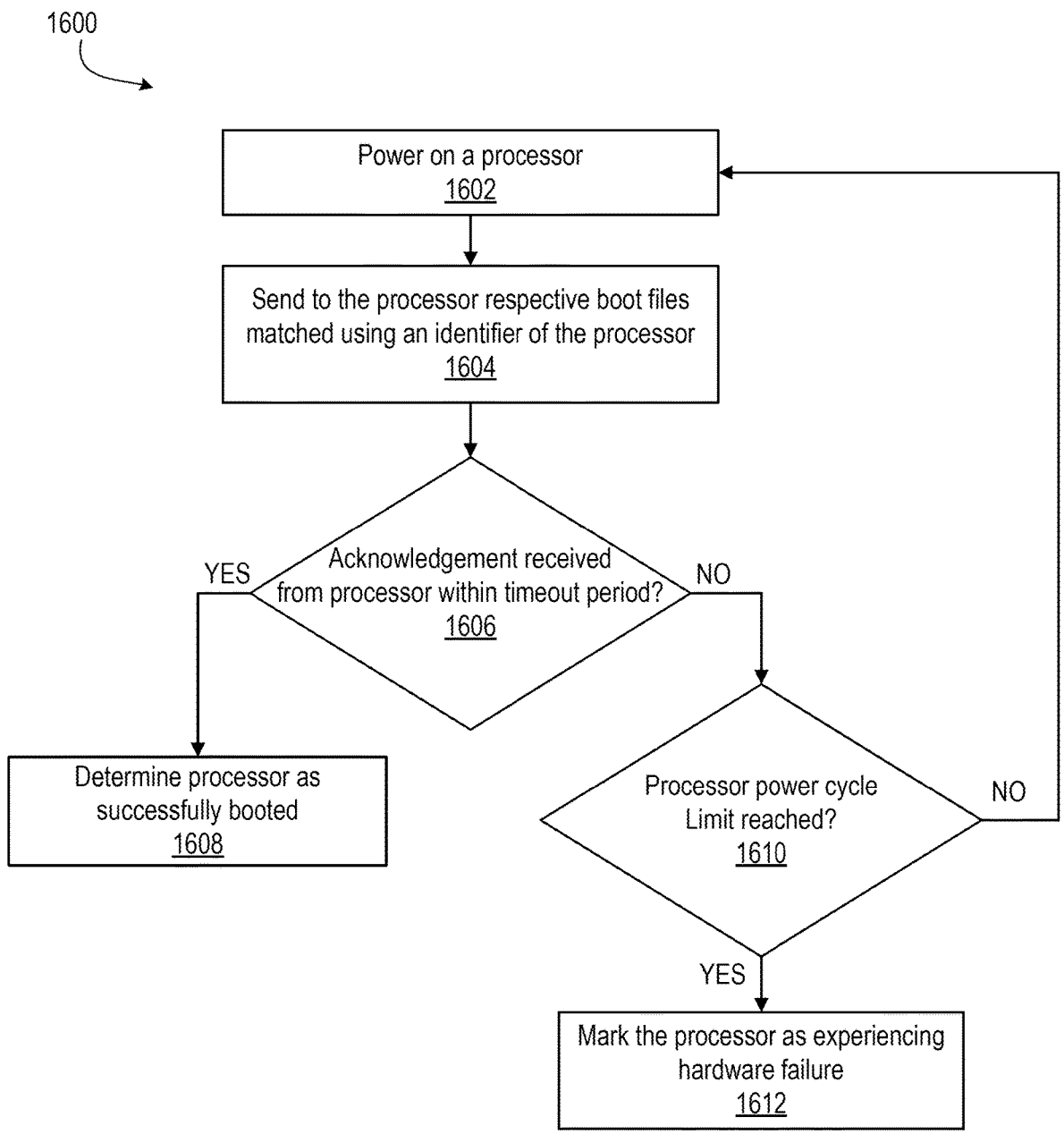

FIG. 16 shows an example process 1600 for sequentially booting vehicular processors. In an embodiment, the process 1600 is performed by the controller 1348 as it boots the processors in the vehicle 1300, such as one or more of processors 1346*a*, 1346*b* and 1346*c*, as described above (1518). Accordingly, the process 1600 is described in the following sections with respect to the controller 1348. However, the process 1600 can also be performed by other devices.

In the process 1600, the controller powers on a processor (1602). For example, the controller 1348 first powers on processor 1346*a* by toggling the switch 1352*a* to a closed state, connecting processor 1346*a* to the power source.

The controller sends to the processor respective boot files matched using an identifier of the processor (1604). For example, each docker container in the manifest file is tagged with a unique network identifier of the target processor, such as the Ethernet MAC address (which is a unique hardware identifier). The controller 1348 sends to a processor a docker container that includes the boot files for the processor and is tagged with the unique network identifier of the processor.

The controller checks whether an acknowledgement is received from the processor within a timeout period (1606). For example, after sending the docker container to processor 1346*a*, the controller 1348 waits for a specified timeout period to receive an acknowledgement message from processor 1346*a* that indicates that the processor has successfully booted.

If the controller receives an acknowledgement from a processor within the timeout period, the controller determines that the processor has successfully booted (1608). For example, if the controller 1348 receives an acknowledgement message from processor 1346*a* before expiry of the timeout period, the controller 1348 determines that the processor 1346*a* has successfully executed the boot files in its docker container and is in a fully operational state.

On the other hand, if the controller does not receive an acknowledgement from a processor within the timeout period, the controller checks whether the processor power cycle limit has been reached (1610). For example, if the controller 1348 does not receive an acknowledgement message from processor 1346*a* by the expiry of the timeout period, the controller 1348 power cycles the nonresponsive processor. Before power cycling, the controller checks whether the power cycling limit for the processor 1346*a* has been reached, e.g., whether the processor 1346*a* has been powered off and on the specified number of times.

If the controller determines that the processor power cycle limit has not been reached, then the controller power cycles the nonresponsive processor, e.g., by toggling the respective switch open and then closed to power on the processor again, repeating the booting process. On the other hand, if the controller determines that the power cycle limit has been reached for the nonresponsive processor, then the controller marks the processor as experiencing hardware failure (1612).

Figure 17:
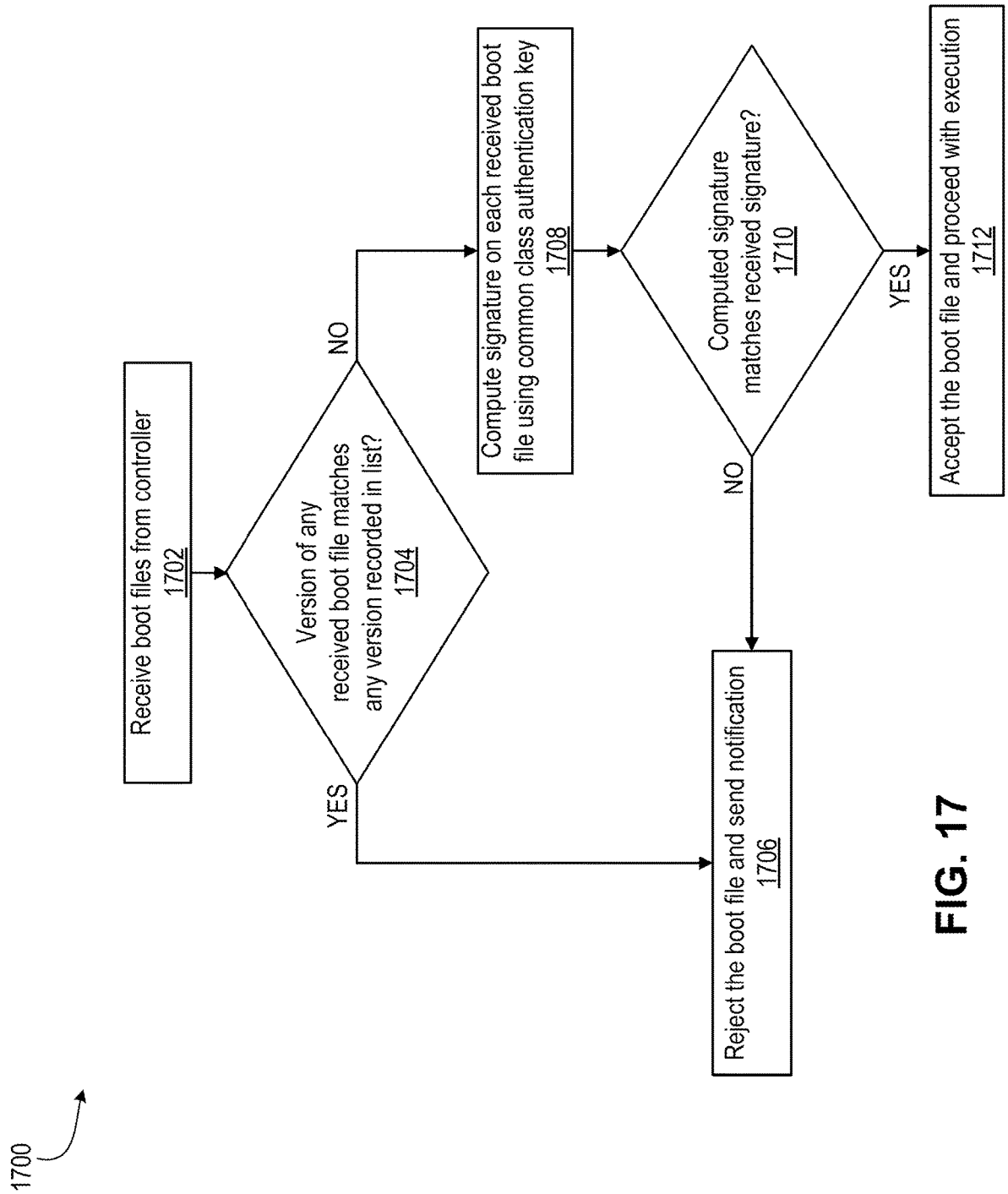

FIG. 17 shows an example process 1700 for a vehicular processor to execute boot files. In an embodiment, the process 1700 is performed by each of the processors in the vehicle 1300, such as processors 1346*a*, 1346*b* and 1346*c*, upon powering on. Accordingly, the process 1700 is described in the following sections with respect to the processors 1346*a*, 1346*b* and 1346*c*. However, the process 1700 can also be performed by other devices.

In the process 1700, a processor receives boot files from a controller (1702). For example, upon powering on, the processor 1346*a* receives a docker container from the controller 1348 that includes boot files to be executed by the processor to configure its functionality. The processor 1346*a* also receives, from the controller 1348 a blacklist of prohibited boot files. Each boot file and the blacklist includes a corresponding digital signature that is signed by a trusted entity, e.g., the server 1336, or a third party trusted authority, such as a Certificate Authority.

The processor checks whether the version of any received boot file matches any version recorded in list (1704). For example, the processor 1346*a* determines the versions of the boot files included in its docker container. For each boot file, the processor checks whether the docker container version is included in the blacklist. In an embodiment, the processor verifies authenticity of the blacklist, e.g., by verifying the digital signature included with the blacklist, before using the blacklist.

If the version of any received boot file matches any version recorded in list, then the processor rejects the boot file and sends a notification (1706). For example, if the processor 1346*a* determines that the docker container version of a boot file is included in the blacklist, the processor discards the boot file as a prohibited file. In an embodiment, the processor 1346*a* sends a notification, e.g., an alert message, to the controller 1348, e.g., indicating that it received a blacklisted version of a boot file in the docker container. In an embodiment, the processor halts execution of other boot files in the docker container, and waits to receive, from the controller 1348, an updated docker container that includes versions of boot files that are permitted to be executed.

On the other hand, if the version of any received boot file does not match any version recorded in list, then the processor computes a signature on each received boot file using common class authentication key (1708). For example, if the processor 1346*a* determines that the docker container version of none of the boot files is included in the blacklist, the processor determines that the boot files in the docker container are approved for execution. The processor 1346*a* accesses its class authentication key, e.g., from secure storage in the vehicle 1300, and computes a digital signature for each boot file using the class authentication key.

The processor checks whether the computed signature for each boot file matches the received signature for the boot file (1710). For example, the processor 1346*a* authenticates each boot file by comparing the signature it computed for the boot file with the signature corresponding to the boot file in the docker container.

If the computed signature does not match the received signature, then the processor rejects the boot file and sends a notification (1706). For example, if the processor 1346*a* determines that the computed signature for one or more boot files is different from the respective received signatures, the processor discards the boot files for failure to authenticate. In an embodiment, the processor 1346*a* sends a notification, e.g., an alert message, to the controller 1348, e.g., indicating that it received boot files that are potentially compromised. In an embodiment, the processor halts execution of other boot files in the docker container, and waits to receive, from the controller 1348, an updated docker container that includes updated, secure versions of boot files.

On the other hand, if the computed signature matches the received signature, then the processor accepts the boot file and proceeds with execution (1712). For example, if the processor 1346*a* determines that the computed signature for a boot file matches the respective received signature, the processor accepts the boot file as authenticate and proceeds to execute the boot file. In an embodiment, the processor authenticates and executes a boot file in an atomic operation, e.g., a boot file is executed immediately upon a successful authentication of the boot file, without any other intervening operation.

Figure 18:
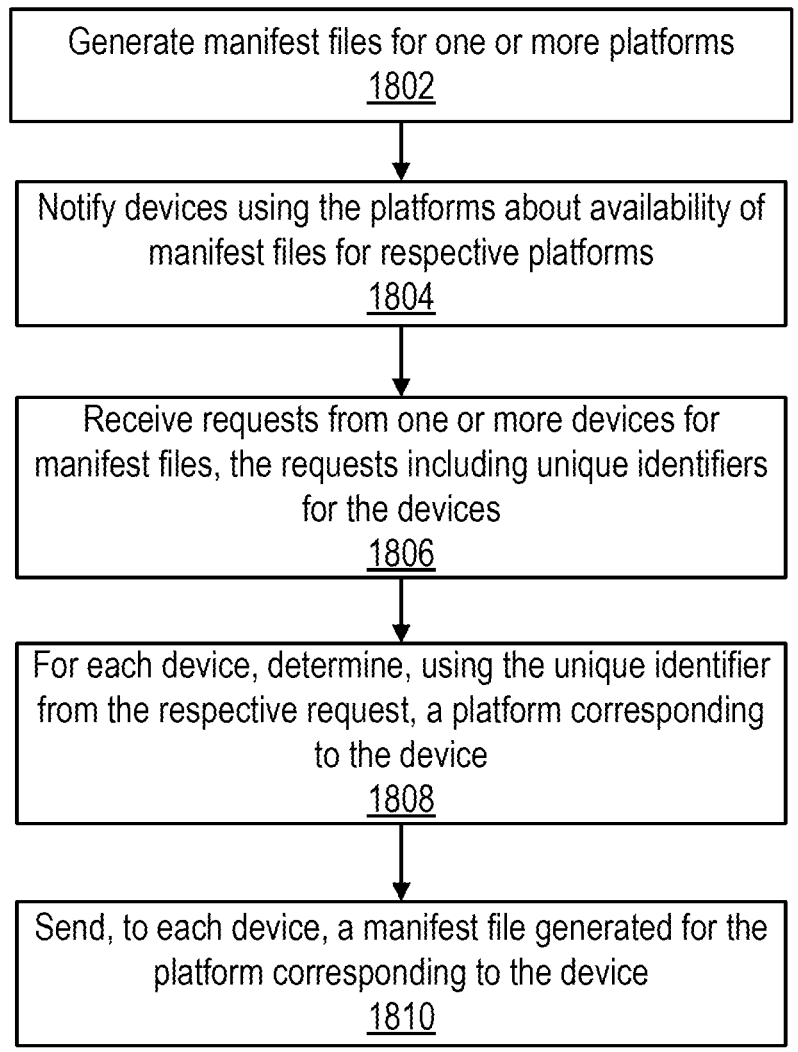

FIG. 18 shows an example process 1800 for distributing manifest files from a server to vehicles. In an embodiment, the process 1800 is performed by the server 1436 for distributing manifest files to collections of vehicles in a fleet, such as vehicles 1404*a*, 1404*b*, 1404*c* in collection 1404 and vehicles 1406*a*, 1406*b*, 1406*c* in collection 1406. Accordingly, the process 1800 is described in the following sections with respect to the server 1436. However, the process 1800 can also be performed by other devices.

In the process 1800, a server generates manifest files for one or more platforms (1802). For example, the collections 1404 and 1406 correspond to a first and a second platform respectively, where different platforms have different AV system software or hardware configuration, or both. An operator managing the fleet of vehicles that include the collections 1404 and 1406 generate and/or update, using the server 1436, distinct manifest files for the first platform and the second platform.

The server notifies devices using the platforms about availability of manifest files for respective platforms (1804). For example, when new or updated manifest files for the collection 1404 are available, a notification message is sent from the server 1436 to the vehicles in the collection 1404, e.g., vehicles 1404*a*, 1404*b* and 1404*c*. Similarly, when new or updated manifest files for the collection 1406 are available, a notification message is sent from the server 1436 to the vehicles in the collection 1406, e.g., vehicles 1406*a*, 1406*b* and 1406*c*. In an embodiment, notification messages for different platforms are sent at different times, e.g., to stagger updates.

The server receives requests from one or more devices for manifest files, the requests including unique identifiers for the devices (1806). For example, the server 1436 receives requests for manifest files from vehicles in the collection 1404, such as one or more of vehicles 1404*a*, 1404*b* and 1404*c*. Additionally or alternatively, the server 1436 receives requests for manifest files from vehicles in the collection 1406, such as one or more of vehicles 1406*a*, 1406*b* and 1406*c*. Each request includes a unique identifier for the requesting vehicle, e.g., a VIN number of the vehicle. In an embodiment, the requests are received after sending the notification messages from the server.

For each device, the server determines, using the unique identifier from the respective request, a platform corresponding to the device (1808). For example, the server 1436 obtains the VIN number from a request. The server 1436 accesses a database that includes records indicating the platform for each vehicle, where the record for a vehicle is tagged using the VIN number for the vehicle. Using the VIN obtained from the request, the server looks up the entries in the database and determines the platform for the vehicle. In this manner, the server determines the platform for each vehicle from which it receives a request for a manifest file.

The server sends, to each device, a manifest file generated for the platform corresponding to the device (1810). For example, upon determining the platform for a vehicle, the server sends to the vehicle the manifest file generated for the vehicle's platform. In an embodiment, the server sends the manifest file for a platform in a batch message, e.g., as a broadcast, to multiple vehicles corresponding to the platform. In an embodiment, the server broadcasts the manifest file for a platform in staggered updates, e.g., sending to a first subset of vehicles corresponding to the platform in a first message, and to a second subset of vehicles corresponding to the platform in a second message at a later time. In an embodiment, the server broadcasts manifest files for different platforms in different messages.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method performed by a network server to distribute manifest files to vehicles, the method comprising:
    generating, using at least one processor, (i) a first manifest file for a first system platform that corresponds to an operating system platform for one or more vehicles, and (ii) a second manifest file for a second system platform corresponding to an operating system platform for one or more other vehicles, the second system platform being different from the first system platform;
    sending, using the at least one processor, (i) a first notification to a first plurality of vehicles using the first system platform about availability of the first manifest file, and (ii) a second notification to a second plurality of vehicles using the second system platform about availability of the second manifest file;
    receiving, using the at least one processor, (i) a first request from a first vehicle of the first plurality of vehicles for a manifest file corresponding to the first vehicle, the first request comprising identifying information about the first vehicle and (ii) a second request from at least one second vehicle of the second plurality of vehicles for a manifest file corresponding to the second vehicle, the second request comprising identifying information about the second vehicle;
    determining, using the at least one processor and based on the identifying information in the first request, that the first vehicle uses the first system platform;
    determining, using the at least one processor and based on the identifying information in the second request, that the second vehicle uses the second system platform;
    in response to determining that the first vehicle uses the first system platform, sending, using the at least one processor, the first manifest file to the first vehicle; and
    in response to determining that the second vehicle uses the second system platform, sending the second manifest file to the second vehicle.

2. The method of claim 1, wherein the second notification is sent to the second plurality of vehicles at a different time than a time when the first notification is sent to the first plurality of vehicles.

3. The method of claim 1, wherein the second manifest file is sent to the second vehicle at a different time than a time when the first manifest file is sent to the first vehicle.

4. The method of claim 1, wherein the first system platform and the second system platform specify at least one of different software operating systems used by vehicles, or different hardware configurations of vehicles, and
    wherein the first and second manifest files specify at least one of one or more different boot files, or different orders of execution of boot files by respective system platforms.

5. The method of claim 1, further comprising:
    receiving a request from a second vehicle of the first plurality of vehicles for a manifest file corresponding to the second vehicle, the request comprising identifying information about the second vehicle;
    determining, based on the identifying information in the request, that the second vehicle uses the first system platform; and
    in response to the determining, sending the first manifest file to the second vehicle,
    wherein the first manifest file is sent to the second vehicle at a different time than a time when the first manifest file is sent to the first vehicle.

6. The method of claim 1, wherein sending the first manifest file to the first vehicle comprises sending the first manifest file to the first plurality of vehicles, comprising the first vehicle, in one or more broadcast messages.

7. The method of claim 6, wherein the first manifest file is sent to (i) a first subset of the first plurality of vehicles in a first broadcast message at a first time, and (ii) a second subset of the first plurality of vehicles in a second broadcast message at a second time,
    wherein the first subset is different than the second subset,
    the first broadcast message is different than the second broadcast message, and
    the first time is different than the second time.

8. The method of claim 1, wherein determining that the first vehicle uses the first system platform based on the identifying information in the request comprises:
    obtaining the identifying information from the request;
    accessing a database comprising records indicating system platforms for each of a plurality of vehicles, each record being tagged using identifying information for a corresponding vehicle;
    determining, using the identifying information obtained from the request, a record in the database corresponding to the first vehicle; and
    determining, using the record corresponding to the first vehicle, that the first vehicle uses the first system platform.

9. The method of claim 1, wherein the first manifest file for the first system platform comprises information about at least one of
    one or more boot files for execution by one or more processors of each vehicle of the first plurality of vehicles, or
    hardware configurations corresponding to the first system platform.

10. An apparatus to distribute manifest files to vehicles, the apparatus comprising:
    one or more processors;

memory storing instructions that, when executed, are configured to cause the one or more processors to perform operations comprising:
  generating (i) a first manifest file for a first system platform that corresponds to an operating system platform for one or more vehicles, and (ii) a second manifest file for a second system platform corresponding to an operating system platform for one or more other vehicles, the second system platform being different from the first system platform;
  sending (i) a first notification to a first plurality of vehicles using the first system platform about availability of the first manifest file, and (ii) a second notification to a second plurality of vehicles using the second system platform about availability of the second manifest file;
  receiving (i) a first request from a first vehicle of the first plurality of vehicles for a manifest file corresponding to the first vehicle, the first request comprising identifying information about the first vehicle and (ii) a second request from at least one second vehicle of the second plurality of vehicles for a manifest file corresponding to the second vehicle, the second request comprising identifying information about the second vehicle;
  determining, based on the identifying information in the first request, that the first vehicle uses the first system platform;
  determining, based on the identifying information in the second request, that the second vehicle uses the second system platform;
  in response to determining that the first vehicle uses the first system platform, sending the first manifest file to the first vehicle; and
  in response to determining that the second vehicle uses the second system platform, sending the second manifest file to the second vehicle.

11. The apparatus of claim 10, wherein the second notification is sent to the second plurality of vehicles at a different time than a time when the first notification is sent to the first plurality of vehicles.

12. The apparatus of claim 10, wherein the second manifest file is sent to the second vehicle at a different time than a time when the first manifest file is sent to the first vehicle.

13. The apparatus of claim 10, wherein the first system platform and the second system platform specify at least one of different software operating systems used by vehicles, or different hardware configurations of vehicles, and
  wherein the first and second manifest files specify at least one of one or more different boot files, or different orders of execution of boot files by respective system platforms.

14. The apparatus of claim 10, the operations further comprising:
  receiving a request from a second vehicle of the first plurality of vehicles for a manifest file corresponding to the second vehicle, the request comprising identifying information about the second vehicle;
  determining, based on the identifying information in the request, that the second vehicle uses the first system platform; and
  in response to the determining, sending the first manifest file to the second vehicle,
  wherein the first manifest file is sent to the second vehicle at a different time than a time when the first manifest file is sent to the first vehicle.

15. The apparatus of claim 10, wherein sending the first manifest file to the first vehicle comprises sending the first manifest file to the first plurality of vehicles, comprising the first vehicle, in one or more broadcast messages.

16. The apparatus of claim 15, wherein the first manifest file is sent to (i) a first subset of the first plurality of vehicles in a first broadcast message at a first time, and (ii) a second subset of the first plurality of vehicles in a second broadcast message at a second time,
  wherein the first subset is different than the second subset, the first broadcast message is different than the second broadcast message, and
  the first time is different than the second time.

17. The apparatus of claim 10, wherein determining that the first vehicle uses the first system platform based on the identifying information in the request comprises:
  obtaining the identifying information from the request;
  accessing a database comprising records indicating system platforms for each of a plurality of vehicles, each record being tagged using identifying information for a corresponding vehicle;
  determining, using the identifying information obtained from the request, a record in the database corresponding to the first vehicle; and
  determining, using the record corresponding to the first vehicle, that the first vehicle uses the first system platform.

18. The apparatus of claim 10, wherein the first manifest file for the first system platform comprises information about at least one of
  one or more boot files for execution by one or more processors of each vehicle of the first plurality of vehicles, or
  hardware configurations corresponding to the first system platform.

19. One or more non-transitory computer-readable media storing instructions that, when executed, are configured to cause one or more processors to perform operations comprising:
  generating a first manifest file for a first system platform that corresponds to an operating system platform for one or more vehicles;
  sending (i) a first notification to a first plurality of vehicles using the first system platform about availability of the first manifest file at a first time and (ii) a second notification to a second plurality of vehicles using the first system platform about availability of the first manifest file at a second time that is different than the first time;
  in response to sending the first notification to the first plurality of vehicles at the first time:
    receiving requests from the first plurality of vehicles for manifest files corresponding to respective vehicles, and sending the first manifest file to the first plurality of vehicles in a first broadcast message; and
  in response to sending the second notification to the second plurality of vehicles at the second time:
    receiving requests from the second plurality of vehicles for manifest files corresponding to respective vehicles, and
    sending the first manifest file to the second plurality of vehicles in a second broadcast message,
    wherein the first broadcast message is different than the second broadcast message.

20. The one or more non-transitory computer-readable media of claim 19, the operations further comprising:

generating a second manifest file for a second system platform that is different from the first system platform;

sending a second notification to a second plurality of vehicles using the second system platform about availability of the second manifest file;

receiving a request from at least one second vehicle of the second plurality of vehicles for a manifest file corresponding to the second vehicle, the request comprising identifying information about the second vehicle;

determining, based on the identifying information in the request, that the second vehicle uses the second system platform; and in response to the determining, sending the second manifest file to the second vehicle, wherein the second manifest file is sent to the second vehicle at a different time than the first time or the second time.

21. The one or more non-transitory computer-readable media of claim 20, wherein the first system platform and the second system platform specify at least one of different software operating systems used by vehicles, or different hardware configurations of vehicles, and wherein the first and second manifest files specify at least one of one or more different boot files, or different orders of execution of boot files by respective system platforms.

22. The one or more non-transitory computer-readable media of claim 19, further comprising, for each vehicle of the first plurality of vehicles:

obtaining the identifying information from the respective request;

accessing a database comprising records indicating system platforms for each of a plurality of vehicles, each record being tagged using identifying information for a corresponding vehicle;

determining, using the identifying information obtained from the respective request, a record in the database corresponding to the vehicle; and determining, using the record corresponding to the vehicle, that the vehicle uses the first system platform.

* * * * *